US012750662B2

(12) United States Patent
Detwiler et al.

(10) Patent No.: US 12,750,662 B2
(45) Date of Patent: Sep. 29, 2026

(54) DIFFERENTIATING OWN ACCESSORIES FROM THOSE OF OTHERS

(71) Applicant: Apple Inc., Cupertino, CA (US)

(72) Inventors: Benjamin A. Detwiler, San Diego, CA (US); Brent M. Ledvina, San Francisco, CA (US); Chen Ganir, San Jose, CA (US); Emmanuel Lalande, Lachine (CA); Michael C. Laster, Santa Clara, CA (US); Siva Ganesh Movva, San Jose, CA (US); Ernst T. Erdmann, San Francisco, CA (US); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/637,105

(22) Filed: Apr. 16, 2024

(65) Prior Publication Data

US 2024/0349042 A1 Oct. 17, 2024

Related U.S. Application Data

(60) Provisional application No. 63/496,666, filed on Apr. 17, 2023.

(51) Int. Cl.
*H04W 12/71* (2021.01)
*H04W 12/04* (2021.01)
*H04W 12/121* (2021.01)

(52) U.S. Cl.
CPC ......... *H04W 12/04* (2013.01); *H04W 12/121* (2021.01)

(58) Field of Classification Search
CPC ............................ H04W 12/04; H04W 12/121
USPC ............................................................ 713/171
See application file for complete search history.

(56) References Cited

U.S. PATENT DOCUMENTS

| | | | | |
|---|---|---|---|---|
| 6,259,367 | B1 * | 7/2001 | Klein | G08B 21/0227 340/568.1 |
| 8,402,134 | B1 * | 3/2013 | Hir | H04W 12/126 709/224 |
| 9,477,894 | B1 * | 10/2016 | Reed | G06V 20/586 |
| 9,712,972 | B2 * | 7/2017 | Lynch | H04W 8/005 |
| 10,657,242 | B1 * | 5/2020 | Xia | H04L 9/0825 |

(Continued)

OTHER PUBLICATIONS

Trine Møller ; Presenting The Accessory Approach: A Start-up's Journey Towards Designing An Engaging Fall Detection Device; ACM:2018; pp. 1-10.*

*Primary Examiner* — Monjur Rahim
(74) *Attorney, Agent, or Firm* — Kilpatrick Townsend & Stockton LLP

(57) ABSTRACT

Portable electronic devices can be used to perform tracking functionality through the exchange of proximity messages. Based on the payload in these messages, a mobile device can detect whether a portable electronic device is likely performing unwanted tracking. The mobile device user may wish to identify an account that is associated with the portable device. In response to a request from the mobile device, the portable electronic device can provide a partial identifier that can be used to determine an associated account. The portable electronic device can also provide information that the mobile device can use to locate disablement instructions that can show how to stop the portable device from performing tracking functionality.

20 Claims, 10 Drawing Sheets

(56) References Cited

U.S. PATENT DOCUMENTS

| | | | | |
|---|---|---|---|---|
| 2005/0091338 | A1* | 4/2005 | de la Huerga | G07C 9/28<br>709/217 |
| 2008/0076393 | A1* | 3/2008 | Khetawat | H04W 16/16<br>455/411 |
| 2013/0041959 | A1* | 2/2013 | Bengtsson | H04L 67/1095<br>709/206 |
| 2014/0370879 | A1* | 12/2014 | Redding | H04M 3/42178<br>455/419 |
| 2015/0356289 | A1* | 12/2015 | Brown | G06F 21/35<br>726/7 |
| 2018/0241760 | A1* | 8/2018 | Stephens | H04L 63/0428 |
| 2019/0162843 | A1* | 5/2019 | Jiang | H04W 24/10 |
| 2019/0191356 | A1* | 6/2019 | Norp | H04W 12/086 |
| 2019/0215694 | A1* | 7/2019 | Rubin | H04W 4/90 |
| 2020/0187150 | A1* | 6/2020 | Eisner | H04W 76/50 |
| 2020/0322805 | A1* | 10/2020 | Wang | H04W 88/10 |
| 2021/0037010 | A1* | 2/2021 | Koshy | H04L 41/082 |
| 2021/0058255 | A1* | 2/2021 | Martins | H04L 9/14 |
| 2021/0092607 | A1* | 3/2021 | Klinkner | H04L 9/30 |
| 2021/0119775 | A1* | 4/2021 | Klinkner | H04L 9/0844 |
| 2021/0152976 | A1* | 5/2021 | Daoura | H04W 52/0254 |
| 2021/0297816 | A1* | 9/2021 | Lau | H04W 4/027 |
| 2022/0103974 | A1* | 3/2022 | De Jong | G06F 3/04886 |
| 2022/0343747 | A1* | 10/2022 | Ju | G08B 21/0277 |
| 2022/0377562 | A1* | 11/2022 | de la Broise | H04L 9/083 |
| 2023/0260384 | A1* | 8/2023 | Haines | H04W 8/16<br>455/411 |

* cited by examiner

DIFFERENTIATING OWN ACCESSORIES FROM THOSE OF OTHERS

CROSS-REFERENCES TO OTHER APPLICATIONS

This application claims priority to U.S. Provisional Application No. 63/496,666, for "RECOGNIZING YOUR OWN ACCESSORIES" filed on Apr. 17, 2023, which is herein incorporated by reference in its entirety for all purposes.

BACKGROUND

Portable electronic devices can be placed on one's own object for use locating such objects when they are misplaced. However, these devices can be used to follow people without their knowledge. Preventing this unwanted tracking should be balanced against the privacy of legitimate users who are not misusing their portable electronic devices. Accordingly, improvements to unwanted tracking are desirable.

BRIEF SUMMARY

Portable electronic devices can be used to locate misplaced objects. However, bad actors may use these portable electronic devices to monitor a person's movements without that person's permission. Techniques of this disclosure can be used to notify a person if an unpaired portable electronic device is shadowing their movements. In addition, the techniques can allow a person in possession of an unpaired portable electronic device to obtain an obfuscated identifier for an account associated with the device. This obfuscated identifier provides sufficient information that the identifier is recognizable to someone familiar with the account while protecting the account holder's privacy.

In one general aspect, techniques may include transmitting a first proximity message having a protocol identifier and a first derived hardware address generated, by a derivation function, using a private key and first timing information, the protocol identifier specifying the derivation function used to generate the first derived hardware address. Techniques may also include receiving a first reply from a mobile device that is paired with the portable electronic device. Techniques may furthermore include transmitting a second proximity message having the protocol identifier and a second derived hardware address generated, by the derivation function, using the private key and second timing information. The techniques include corresponding methods, computer systems, apparatus, and computer programs recorded on one or more computer storage devices, each configured to perform the actions of the techniques.

In one general aspect, techniques may include receiving, from one or more portable devices, proximity messages at the mobile device, each of the proximity messages including a device identifier. Techniques may also include detecting a specified amount of received proximity messages with a first hardware address. Techniques may furthermore include requesting a set of hardware addresses from one or more application interfaces, where each of the one or more application interfaces is associated with a respective protocol for providing a respective set of hardware addresses. Techniques may in addition include for each respective set of hardware addresses: comparing the respective set of hardware addresses to the first hardware address. Techniques may moreover include responsive to determining that none of the hardware addresses match the first hardware addresses, flagging a device associated with the first hardware address as an unwanted tracking device. The techniques include corresponding methods, computer systems, apparatus, and computer programs recorded on one or more computer storage devices, each configured to perform the actions of the techniques.

In one general aspect, techniques may include receiving a triggering signal. Techniques may also include generating an encrypted serial number by encrypting the serial number of the portable device using a public key of a server, thereby obtaining an encrypted payload including the encrypted serial number. Techniques may furthermore include responsive to the triggering signal: transmitting, via the wireless short-range communication circuit, the encrypted payload in a manner detectable by a proximate electronic device that is operable to communicate with the server; and transmitting, to the proximate electronic device, a product identifier of the portable device, where the product identifier indicates an identity of the server to the proximate electronic device. The techniques include corresponding methods, computer systems, apparatus, and computer programs recorded on one or more computer storage devices, each configured to perform the actions of the techniques.

In one general aspect, techniques may include receiving, from an electronic device, an encrypted payload. Techniques may also include decrypting, using a private key, the encrypted payload to obtain a serial number of a portable device that provided the encrypted payload to the electronic device. Techniques may furthermore include accessing an owner database using the serial number to obtain a partial identifier of an owner of the portable device. Techniques may in addition include sending the partial identifier to the electronic device. The techniques include corresponding methods, computer systems, apparatus, and computer programs recorded on one or more computer storage devices, each configured to perform the actions of the techniques.

The techniques may include a computer-readable medium storing a plurality of instructions that, when executed by one or more processors of a computing device, cause the one or more processors to perform operations of any of the techniques. The techniques may include a computing device with one or more non-transitory memories and one or more processors in communication with the one or more memories and configured to execute instructions stored in the one or more memories to perform operations of any of the techniques. The techniques may include corresponding methods, systems, hardware, devices, computer program products, or non-transitory computer readable media to perform any of the techniques.

DETAILED DESCRIPTION OF THE INVENTION

Figure 1:
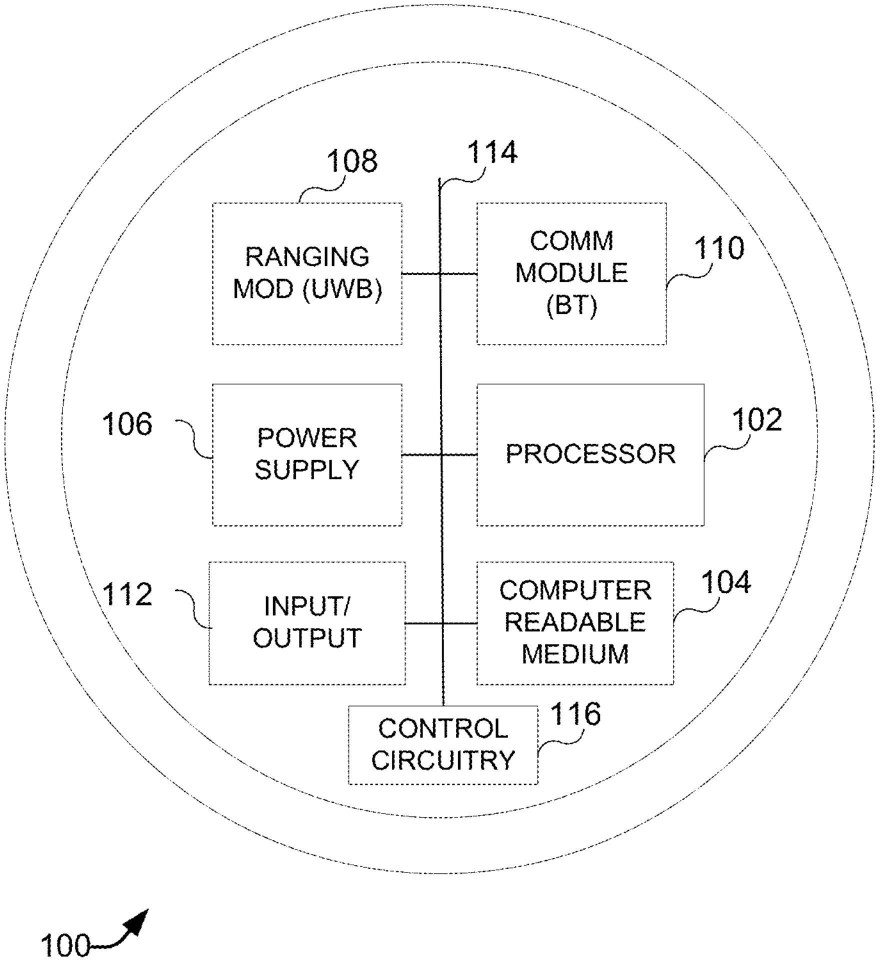
FIG. 1 is a block diagram of an example electronic device according to embodiments of the present disclosure.

Portable electronic devices (e.g., portable trackers such as Tile tracker or an AirTag) can be used to perform tracking functionality through the exchange of proximity messages. Based on the payload in these messages, a mobile device can determine whether a portable electronic device is likely performing unwanted tracking. For example, a mobile device can recognize a portable electronic device that is persistently (e.g., longer than a threshold amount of time) in the vicinity of the mobile device via the proximity messages, which can include a hardware address (e.g., any information that is specific to the device). If a same hardware address is persistently present then that portable device may be identified as a tracker, but the portable device may be owned by the user of the mobile device. It can be challenging to determine the identity of the portable device in a manner that does not unnecessarily expose the identity to other devices in the vicinity, e.g., so other devices cannot track your own tracking device.

Such portable devices may be manufactured by any number of different companies and managed using any number of applications on the mobile device. To determine whether a tracking device is wanted or not (e.g., one's own tracker), a received address can be matched to hardware addresses generated in conjunction with each of the applications. If a received address matches one of a set of address generated by the mobile device, then it can be determined that the portable device is wanted. However, if there is no match, the portable device can be identified as an unwanted tracker. A system routine on the mobile device can obtain the set of hardware addresses from one or more applications, e.g., via a request to application protocol interfaces (APIs), where an application provides a respective subset of addresses. These subsets of addresses can be rotating addresses that are generated based on timing information.

A mobile device user may wish to identify an owner of the portable device, and access to ownership information may create a sense of accountability that can discourage unwanted tracking. However, accountability may need to be balanced against the owner's privacy. Accordingly, the ownership information can be returned as a partial identifier. This partial identifier can be obfuscated so that someone familiar with the owner can recognize his or her identity without exposing the owner's identity to strangers.

A user in possession of the portable device can use a mobile device to retrieve the partial identifier from a registry. For example, a triggering signal received at the portable electronic device can induce the device to generate and transmit an encrypted payload to a mobile device. This encrypted payload can include information identifying the portable device such as a serial number. The triggering signal can be a simple interaction with the portable electronic device such as a gesture, button press, or near-field communication (NFC) tap from the mobile device. The transmission can be sent between the portable device and the mobile device as a wireless short-range communication signal. Upon receiving the signal, the mobile device can transmit the signal to a database that can return a partial identifier to the mobile device.

After locating an unwanted tracking device, the user may wish to disable the portable device's tracking functionality. The instructions for disabling the portable device (e.g., disablement instructions) can include, for example, steps for how to remove the device's battery. Information identifying a location with the disablement instructions can be provided to a mobile device by the portable device. These instructions can be shown on the mobile device's user interface. For example, the portable electronic device can provide a uniform resource locator (URL) that the mobile device can use to retrieve the disablement instructions, or the portable electronic device can provide information that the mobile device can use to retrieve the URL from a server. Upon retrieving the instructions, the mobile device can present the disablement instructions to the user.

I. Example Portable Devices and Uses Thereof

Tracking functionality can be beneficial in both business and personal settings. For instance, an employer may want to track inventory in a business' warehouse, or a parent may want to locate a child's lost backpack. As described herein, portable electronic devices can be used to implement various tracking functionalities.

A. Example Device Architecture

FIG. 1 is a block diagram of an example electronic device 100. Device 100 generally includes one or more processor(s) 102, a computer-readable medium 104, a power system 106, a ranging module 108, a communication module (e.g., Bluetooth), and I/O subsystem 112. These components may be coupled by one or more communication buses or signal lines 114. Device 100 can be any electronic device, including a portable electronic device, a handheld computer, a tablet computer, a mobile phone, a laptop computer, a tablet device, a media player, personal digital assistant (PDA), a key fob, a car key, an electronic tag, an access card, a multifunction device, a mobile phone, a portable gaming device, a headset, or the like, including a combination of two or more of these items.

It should be apparent that the architecture shown in FIG. 1 is only one example of an architecture for device 100, and that device 100 can have more or fewer components than shown, or a different configuration of components. The various components shown in FIG. 1 can be implemented in hardware, software, or a combination of both hardware and software, including one or more signal processing and/or application specific integrated circuits. Although the electronic device 100 is depicted as being round in shape it is not so limited.

A communication module 110 can include wireless circuitry that can be used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry can use various protocols, e.g., as described herein. In various embodiments, wireless circuitry is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

One or more processor(s) 102 communicate with computer-readable medium 104. Computer-readable medium 104 can be any device or medium that can store code and/or data for use by one or more processor(s) 102. Computer-readable medium 104 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)).

Processor(s) 102 can include hardware and/or software elements that perform one or more processing functions, such as mathematical operations, logical operations, data manipulation operations, data transfer operations, controlling the reception of user input, controlling output of information to users, or the like. Processor(s) 102 can be embodied as one or more hardware processors, microprocessors, microcontrollers; field programmable gate arrays (FPGAs), application-specified integrated circuits (ASICs), or the like.

Device 100 may include storage and processing circuitry such as control circuitry 116. Control circuitry 116 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 116 may be used to control the operation of device 100. This processing circuitry may be based on one or more microprocessors, microcontrollers, digital signal processors, baseband processor integrated circuits, application specific integrated circuits, etc.

Control circuitry 116 may be used to run software on device 100, such as location tracking applications, internet browsing applications, voice-over-internet-protocol (VOIP) telephone call applications, email applications, media playback applications, operating system functions, etc. To support interactions with external equipment, control circuitry 116 may be used in implementing communications protocols. Communications protocols that may be implemented using control circuitry 116 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 100 may include I/O subsystem 112. I/O subsystem 112 may include input-output devices. Input-output devices may be used to allow data to be supplied to device 100 and to allow data to be provided from device 100 to external devices. Input-output devices may include user interface devices, data port devices, and other input-output components. For example, input-output devices may include one or more displays (e.g., touch screens or displays without touch sensor capabilities), one or more image sensors (e.g., digital image sensors), motion sensors, and speakers. Input-output device may also include buttons, joysticks, scrolling wheels, touch pads, key pads, keyboards, microphones, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 100 also includes a power system 106 for powering the various hardware components. Power system 106 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 100 includes an image sensor (e.g., a camera). In some embodiments, device 100 includes sensors. Sensors can include accelerometers, compass, gyrometer, pressure sensors, audio sensors, light sensors, barometers, and the like. Sensors can be used to sense location aspects, such as auditory or light signatures of a location.

In some embodiments, device 100 can include a GPS receiver, sometimes referred to as a GPS unit. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processor(s) 102 run various software components stored in computer-readable medium 104 to perform various functions for device 100. In some embodiments, the software components include an operating system, a communication module 110 (or set of instructions), a location module (or set of instructions), a ranging module 108 that is used as part of ranging operation described herein, and other application programs (or set of instructions).

The operating system can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 110 facilitates communication with other devices over one or more external ports or via wireless circuitry and includes various software components for handling data received from wireless circuitry and/or external port. The external port (e.g., universal serial bus (USB), FireWire, Lightning connector, 60-pin connector, etc.) is adapted for coupling directly to other devices or indirectly over a network (e.g., the Internet, wireless LAN, etc.).

Location/motion module can assist in determining the current position (e.g., coordinates or other geographic location identifiers) and motion of device 100. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module receives data from GPS unit 148 and analyzes the signals to determine the current position of the mobile device. In some embodiments, location/motion module can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry and is passed to location/motion module. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 100 based on the position coordinates of the corresponding transmitters. Regardless of the specific location technology used, location/motion module receives information from which a location fix can be derived, interprets that information, and returns location information, such as geographic coordinates, latitude/longitude, or other location fix data.

Ranging module 108 can send/receive ranging messages to/from an antenna, e.g., connected to wireless circuitry. The messages can be used for various purposes, e.g., to identify a sending antenna of a device, determine timestamps of messages to determine a distance of mobile device 100 from another device. Ranging module 108 can exist on various processors of the device, e.g., an always-on processor (AOP), a UWB chip, and/or an application processor. For example, parts of ranging module 108 can determine a distance on an AOP, and another part of the ranging module can interact with a sharing module, e.g., to display a position of the other device on a screen in order for a user to select the other device to share a data item. Ranging module 108 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 100 (e.g., portions of the display cover layer, portions of a plastic antenna window in a metal housing sidewall portion of housing, etc.). With one illustrative configuration, some or all of the rear face of device 100 may be formed from a dielectric. For example, the rear wall of housing may be formed from glass plastic, ceramic, other dielectric. In this type of arrangement, antennas may be mounted within the interior of device 100 in a location that allows the antennas to transmit and receive antenna signals through the rear wall of device 100 (and, if desired, through optional dielectric sidewall portions in housing). Antennas may also be formed from metal sidewall structures in housing and may be located in peripheral portions of device 100.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas are being adversely affected due to the orientation of housing, blockage by a user's hand or other external object, or other environmental factors. Device 100 can then switch one or more replacement antennas into use in place of the antennas that are being adversely affected.

Antennas may be mounted at the corners of housing, along the peripheral edges of housing, on the rear of housing, under the display cover layer that is used in covering and protecting the display on the front of device 100 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 100. As an example, antennas may be mounted at one or both ends of device 100 (e.g., along the upper and lower edges of housing, at the corners of housing, etc.).

Antennas in device 100 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 100 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors may include one or more visible digital image sensors (visible-light cameras) and/or one or more infrared digital image sensors (infrared-light cameras). Image sensors may, if desired, be used to measure distances. For example, an infrared time-of-flight image sensor may be used to measure the time that it takes for an infrared light pulse to reflect back from objects in the vicinity of device 100, which may in turn be used to determine the distance to those objects. Visible imaging systems such as a front and/or rear-facing camera in device 100 may also be used to determine the position of objects in the environment. For example, control circuitry may use image sensors to perform simultaneous localization and mapping (SLAM). SLAM refers to the process of using images to determine the position of objects in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 116 may rely entirely upon image sensors to perform simultaneous localization and mapping, or control circuitry 116 may synthesize image data with range data from one or more distance sensors (e.g., light-based proximity sensors). If desired, control circuitry 116 may use the display to display a visual representation of the mapped environment.

Input-output devices may include motion sensor circuitry. Motion sensor circuitry may include one or more accelerometers (e.g., accelerometers that measure acceleration along one, two, or three axes), gyroscopes, barometers, magnetic sensors (e.g., compasses), image sensors (e.g., image sensor) and other sensor structures. Sensors may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 116 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 116. Movement generation circuitry may include electromechanical actuator circuitry that, when driven, moves device 100 in one or more directions. For example, movement generation circuitry may laterally move device 100 and/or may rotate device 100 around one or more axes of rotation. Movement generation circuitry may, for example, include one or more actuators formed at one or more locations of device 100. When driven by a motion control signal, actuators may move (e.g., vibrate, pulse, tilt, push, pull, rotate, etc.) to cause device 100 to move or rotate in one or more directions. The movement may be slight (e.g., not noticeable or barely noticeable to a user of device 100), or the movement may be substantial. Actuators may be based on one or more vibrators, motors, solenoids, piezoelectric actuators, speaker coils, or any other desired device capable of mechanically (physically) moving device 100.

Some or all of movement generation circuitry such as actuators may be used to perform operations that are unrelated to rotation of device 100. For example, actuators may include vibrators that are actuated to issue a haptic alert or notification to a user of device 100. Such alerts may include, for example, a received text message alert identifying that device 100 has received a text message, a received telephone call alert, a received email alert, an alarm notification alert, a calendar notification alert, or any other desired notification. By actuating the actuator, device 100 may inform the user of any desired device condition. For instance, the actuators may be vibrators can be actuated to identify the devices location to a user or a third party.

Motion sensor circuitry may sense motion of device 100 that is generated by movement generation circuitry. If desired, motion sensor circuitry may provide feedback signals associated with the sensed motion of device 100 to movement generation circuitry. Movement generation circuitry may use the feedback signals to control actuation of the movement generation circuitry.

Control circuitry 116 may use motion sensor circuitry and/or movement generation circuitry to determine the angle of arrival of wireless signals received by device 100 from another electronic device. For example, control circuitry 116 may use movement generation circuitry to move device 100 from one position to another. Motion sensor circuitry may be used to track the movement of device 100 as it is moved between the different positions. At each position, control circuitry 116 may receive wireless signals from another electronic device. Control circuitry 116 may process the received wireless signals together with the motion data from motion sensor circuitry to more accurately determine the position of the other electronic device. The use of motion generation circuitry is merely illustrative, however. If desired, motion sensor circuitry may track movement of device 100 that is not caused by motion generation circuitry. This may include a user's natural, unprompted movement of device 100 and/or the user's movement of device 100 after the user is prompted (by display, audio circuitry, a haptic output device in device 100, or any other suitable output device) to move device 100 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Communications module 110 may include radio-frequency transceiver circuitry for handling various radio-frequency communications bands. For example, communication module 110 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for a receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 100 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications on device 100 can include any applications installed on the device 100, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The output of the timing module can be a local time (e.g., a current time in a particular time zone). The timer module can also be implemented in hardware. The time module can maintain various timers for any number of events.

I/O subsystem 112 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 112 can include a display and user input devices such as a keyboard, mouse, and/or trackpad. In some embodiments, I/O subsystem 112 can include a touch-sensitive display. A touch-sensitive display can also accept input from the user based at least in part on haptic and/or tactile contact. In some embodiments, a touch-sensitive display forms a touch-sensitive surface that accepts user input. The touch-sensitive display/surface (along with any associated modules and/or sets of instructions in computer-readable medium) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 112 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 100 can include a touchpad (not shown) for activating or deactivating particular functions. In some embodiments, the touchpad is a touch-sensitive area of the device 100 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

B. Use as a Tracker

Electronic device 100 can be a portable electronic device that is configured to perform tracking functionality. This tracking functionality can include various position and location tracking techniques including global positioning system (GPS) enabled tracking or Bluetooth low energy (BLE) enabled tracking using one or more of time of flight (ToF) calculations and received signal strength indicator (RSSI) measurements. The techniques can include Bluetooth crowd-sourcing, GPS/GNSS location, WiFi location, cellular location, etc. The location may be provided by the portable device or via a device in communication with the portable device. For example, a mobile phone can detect the presence of a portable device and provide location information to a server in connection with an identifier of the portable device. Control circuitry 117 can generate the identifier, such as a derived hardware address, using a key derivation function. A private key, such as a hardware address of device 100 can be input to the derivation function and control circuitry 117 can calculate a derived hardware address as an output from the function. In some embodiments, control circuitry 117 can retrieve a derived hardware address from a precalculated table of hardware addresses.

Location information for the portable electronic device can be provided, via a network connection, to an electronic device with permission to track the portable electronic device. This location information can allow the electronic device to monitor the location of the portable electronic device. The portable electronic device can report its location using a network connection such as a personal area network (e.g., when the two devices are near each other), a cellular network, an internet connection, etc. When using a personal area network, such as Bluetooth, the electronic device may receive a notification when the network connection is lost. This notification can inform the electronic device's user that the portable electronic device is no longer near the electronic device.

The portable electronic device can be tracked through a crowdsourced network of electronic devices using a combination of network connection such as personal area networks and wide area networks. Periodically, the portable electronic device can transmit proximity messages to nearby electronic devices over the personal area network, and a recipient of a proximity message can provide tracking information, including one or more of the message's payload, timing information, and location, to a tracking system using a wide area network. The tracking system can use the tracking information to create a log of the portable electronic device's movements that can be accessed by the portable electronic device's user. The tracking information may be encrypted, modified, anonymized, or hidden from the recipient electronic device to protect the privacy of the portable electronic device's user.

II. Differentiating Between Own Portable Device and Others

A portable electronic device can perform tracking functionality by reporting the portable device's location to other electronic devices. This tracking functionality can allow someone to locate a lost dog or misplaced keys when used appropriately. However, tracking functionality may be used inappropriately to follow someone without their consent. For instance, a bad actor may hide a portable electronic device on a person or object they wish to track and follow the hidden portable device's location remotely.

A mobile device can be configured to monitor for unwanted tracking by portable electronic devices. Such portable electronic device may have two different states: a near for when the portable electronic device is near a paired mobile device, or a far for when the portable electronic device is not paired to any nearby mobile devices. Two electronic devices can be paired if the devices are linked so that the devices can communicate over a personal area network. During this linking, the portable electronic device can provide a hardware address to the mobile device and receive a reply message with an identifier of the paired mobile device. If a portable device does not receive a reply message from a paired mobile device within a specified amount of time, the portable device can be determine it is in a far state.

A mobile device can monitor for devices in the far state to determine if an unpaired, and potentially unwanted, portable electronic device is following the mobile device. A portable device in a far state may be performing unwanted tracking. Such a device is not near a paired electronic device and the portable electronic device may be reporting the portable device's location. A mobile device can use logic to determine if a far state portable electronic device (e.g., far state device) is following the mobile device. For instance, the far state portable device may be flagged as an unwanted tracking device if the far state device is near the unpaired mobile device for a sufficiently long time period (e.g., longer than a specified amount of time), if the far state device follows the mobile device to a threshold number of locations, or if the far state device follows the mobile device to a sensitive location (e.g., home, office, etc.). Once detected, mobile device can cause the unwanted portable electronic device to emit a sound, vibrate, or emit light so that the unwanted device can be located. As another example, the mobile device can provide a notification to the user about the unwanted tracking device.

A portable electronic device's state can be determined from the device's proximity messages, because the payload of these proximity messages can depend on the device's state. Proximity messages can include payloads that identify the electronic device to a paired mobile device using a hardware address such as a Media Access Control (MAC) address. These hardware addresses can be derived hardware addresses that are generated from the proximity device's primary hardware address using a key derivation function. In a near state, a proximity message may include a rotating derived hardware address that changes at regular intervals (e.g., every 15 minutes). In a far state, the derived hardware address in the proximity message may change at a slower interval (e.g., every 24 hours). Accordingly, a mobile device can identify unwanted tracking by monitoring proximity messages from portable electronic devices.

A. Payload from Portable Device

The portable electronic device (e.g., transmitting portable device) can vary the payload in transmitted proximity messages based on whether the device is in a near state or a far state. This payload can contain a protocol identifier and a derived hardware address. The mobile device can use the protocol identifier to obtain a set of hardware addresses that can be compared to the payload's derived hardware address. If the comparison does not find any matching hardware addresses, the portable electronic device is not paired with the mobile device, and the portable electronic device may be an unwanted tracking device.

1. Data in Payload

The payload for a proximity message can indicate whether a portable electronic device is near a paired mobile device. This payload can include a derived hardware address calculated from the portable electronic device's hardware address. The derived hardware address can rotate (e.g., change) at regular intervals when the portable electronic device is in a near state, and the derived hardware address may be static for a longer time period when the portable electronic device is in a far state. The different behavior between states can allow a device receiving the proximity messages to determine the portable electronic device's state by comparing the payloads of received proximity messages.

The proximity message payload can be between twelve and thirty-seven bytes long. For example, bytes 0-5 can include the derived hardware address. In some embodiments, bytes 6-8 can optionally be reserved for flags that a device identifier can use to implement tracking functionality (e.g., to track the location of the portable device). Bytes 9-12 are reserved for service data type-length-value information for the payload. Byte 13 represents a protocol identifier, and the protocol identifier can be a unique identifier for a particular manufacturer or manufacturer product line (e.g., the particular manufacturer can have multiple product lines). The protocol identifier value can be assigned in coordination among manufacturers to ensure that a protocol identifier is unique to a particular manufacturer or manufacturer product line. The mobile device can store a table to cross reference a particular product identifier with a particular manufacturer or manufacturer product line. The product identifier can be provided to an application by the mobile device and the application can use the product identifier to identify one or more corresponding hardware addresses or a corresponding key derivation function. Byte 14 can be a state flag that indicates whether the portable device has determined that the device is in a near state or a far state. Bytes 15-36 can include payload data for the manufacturer, and, for example, the payload data can include information that is used to implement tracking functionality.

The derived hardware address in proximity messages from a near state portable electronic device can change at different intervals. For instance, the derived hardware address can change after every message, after a fixed number of messages, or after a time period. The changes to the derived hardware address may be event based, and, for example, the portable electronic device can rotate the derived hardware address when a portable electronic device accelerometer detects movement, or when the portable electronic device receives one or more reply messages sent in response to the proximity message.

The portable electronic device can select the derived hardware addresses from a precalculated list, or the device can calculate a derived hardware address. In some embodiments, the derived hardware addresses can be calculated from the portable electronic device's hardware address using a key derivation function. A key derivation function can be a cryptographic algorithm that can calculate one or more derived hardware addresses from a given hardware address (e.g., private key). The portable electronic device may provide the hardware address, and timing information, as input to a particular derivation function (e.g., a key derivation function), and the particular key derivation function can output a derived hardware address.

A key derivation function is a cryptographic algorithm that can be used to generate a derived hardware address from a secret value using a pseudorandom function. The secret value can be a private key, and the private key can be a hardware identifier for the portable device. Key derivation functions can be used to stretch the private key into a longer key or to obtain keys of a required format. For example, the key derivation function can convert a group element that is the result of a Diffie-Hellman key exchange into a symmetric key that can be used with advanced encryption standard (AES). The pseudo random function can be a keyed cryptographic hash function such as secure hash algorithm 2 or secure hash algorithm 3.

A derived hardware address, or a key derivation function used to generate the derived hardware address, can be associated with a protocol identifier. This derived hardware address and a protocol identifier associated with the particular key derivation function can be included in the proximity message payload. It may be difficult or impossible to determine the original hardware address from a derived hardware address without the key derivation function.

A state flag in the portable electronic device's payload can indicate the portable electronic device's state. The state flag can be a binary value that informs the recipient of a proximity message that the transmitting portable electronic device is in a near or far state. The state flag can be an alternative, or compliment, to comparing received hardware addresses to determine a portable electronic device's state.

2. Flowchart

A portable electronic device's state can determine the payload of the device's proximity messages. By monitoring the proximity messages, a mobile device can determine if a portable electronic device near the mobile device is likely performing unwanted tracking.

Figure 2:
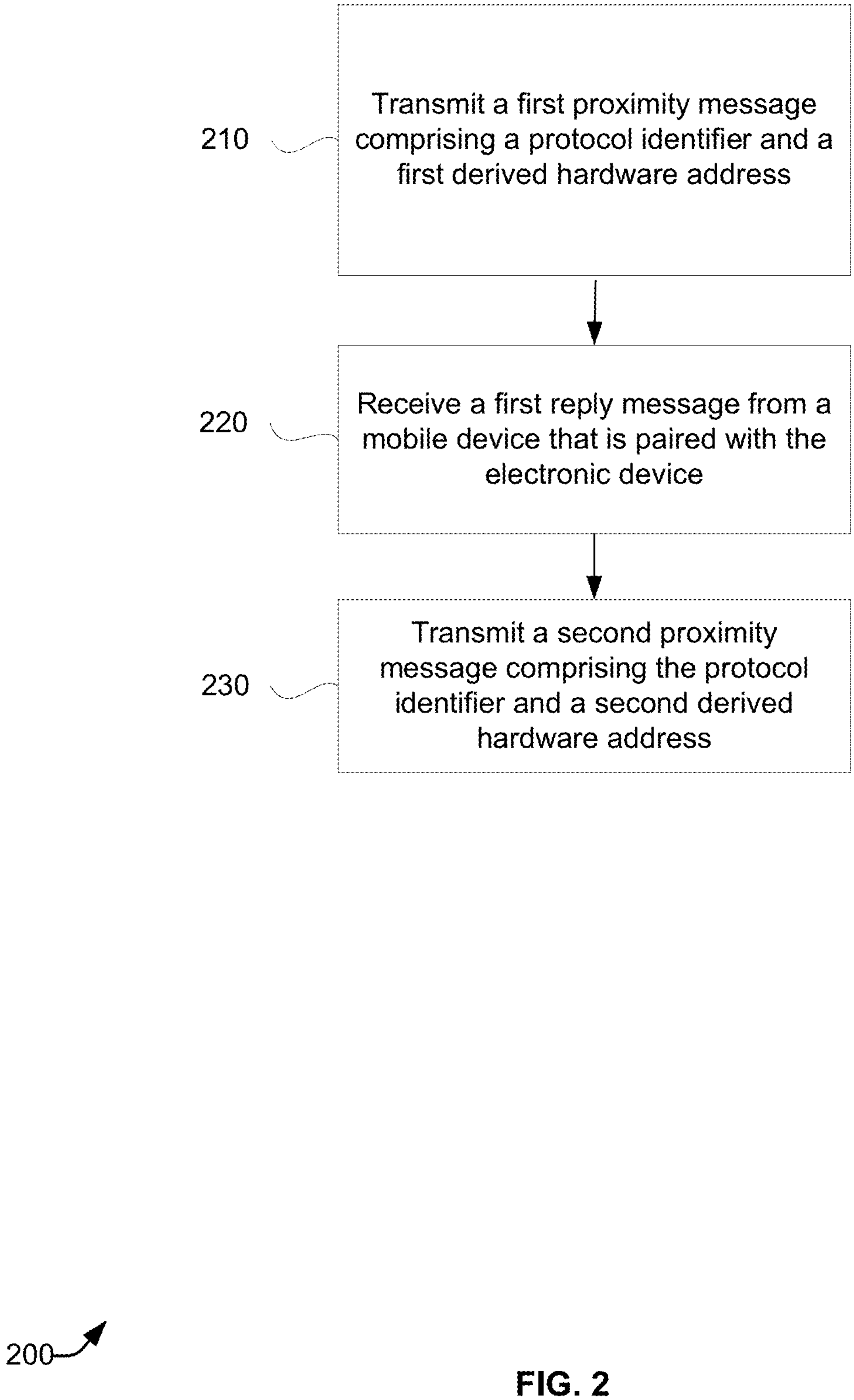
FIG. 2 is a flow chart of process for transmitting proximity messages from a portable electronic device according to embodiments of the present disclosure.

FIG. 2 is a flow chart of process 200 for transmitting proximity messages from a portable electronic device according to embodiments of the present disclosure. In some implementations, one or more process blocks of FIG. 2 can be performed by a portable electronic device such as electronic device 100. In some implementations, one or more process blocks of FIG. 2 can be performed by another device or a group of devices separate from or including the portable electronic device.

At block 210, a first proximity message comprising a protocol identifier and a first derived hardware address is transmitted. The protocol identifier species a derivation function that is used to generate the first derived hardware address using a private key and first timing information. The private key can be a static hardware address associated with the portable electronic device (e.g., a hardware address that was assigned to the portable device by the device manufacturer). The protocol identifier can be used by a mobile device to retrieve or generate a set of derived hardware addressees. For example, timing information and a private key can be provided as input to a derivation function associated with the protocol identifier, and a first derived hardware address can be output by the key derivation function. The protocol identifier can be provided to an application, through an application interface, and the application can return one or more pre-calculated hardware addresses in response to the identifier. In addition, or alternatively, the application can return a key derivation function in response to the protocol identifier and the mobile device can use the key derivation function to generate one or more derived hardware addresses. The timing information can be transmitted in a proximity message and the timing information can comprise a local time on an internal clock of the portable electronic device. The private key can be received from the mobile device during a pairing procedure.

At block 220, a first reply is received from a mobile device that is paired with the portable electronic device. The reply message can be transmitted in response to the mobile device receiving the proximity message from 210. The mobile device may transmit the reply message in response to matching the first derived hardware address from 210 and a derived hardware address obtained by the mobile device.

At block 230, a second proximity message comprising the protocol identifier and a second derived hardware address is transmitted. The second derived hardware address is generated by the derivation function from 210 using the private key from 210 and second timing information. In some embodiments, the timing information may change at regular intervals and two or more proximity messages may be transmitted with the first timing information and the first derived hardware address. For example, the timing information from 11:00:00 am-11:14:59 may be 11:00 am, and the timing information from 11:15:00 am-11:29:59 am can be 11:15 am. The intervals can be regular intervals or variable intervals in different embodiments. The portable electronic device may transmit a message with the first derived hardware address and the second timing information in response to not receiving a reply message at 220.

A state flag can be changed from a near state to a far state if a second reply message is not received from the mobile device during a time period after transmitting. After changing the state flag, a third proximity message comprising the state flag, the protocol identifier, and the second derived hardware address can be transmitted by the portable electronic device. The state flag may be changed from a near state to a far state in response to not receiving a second reply message after transmitting a threshold number of third reply messages. The mobile device may request disablement instructions in response to a determination that the portable electronic device is an unwanted tracking device.

Although FIG. 2 shows example steps of process 200, in some implementations, process 200 can include additional steps, fewer steps, different steps, or differently arranged steps than those depicted in FIG. 2. Additionally, or alternatively, two or more of the steps of process 200 can be performed in parallel.

B. Matching on Mobile Device

A mobile device receiving the proximity message can retrieve, or calculate, a derived hardware address. For example, the mobile device can use a hardware address received during pairing of the two devices, and the timing information from the proximity message, as input to the derivation function. A particular derivation function (or equivalently a corresponding application) can be identified using a protocol identifier, if received in a proximity message. In response, the key derivation function can output the derived hardware address.

In addition or alternatively, the mobile device may use the protocol identifier and timing information from the proximity message to retrieve one or more derived hardware addresses. These derived hardware addresses can be pre-generated (e.g., by a third computing device or by the mobile device), and the mobile device can retrieve the pre-generated derived hardware addresses using an application interface (e.g., a widget; a widget can be an application extension with higher priority access to the mobile device's resources than the parent application).

The mobile device can compare the first derived hardware address received from the portable electronic device and the second derived hardware address that was retrieved, or calculated, by the mobile device. If the two derived hardware addresses match, the portable electronic device and the mobile device are paired, and, if the two derived hardware addresses do not match, the portable electronic device and the mobile device are not paired. The protocol identifier reduces the possibility that the first derived hardware address and the second derived hardware address match by random chance, because both the derived hardware addresses and the protocol identifiers would both have to match.

The key derivation function can use time as an input, and the mobile device can use the timing information from the mobile device to obtain an appropriate derived hardware address. However, the clocks for both devices may not be synchronized, and this desynchronization could lead to a paired mobile device obtaining an incorrect derived hardware address. The two electronic devices may be improperly categorized as not paired if one or more incorrect derived hardware addresses are obtained (e.g., retrieved or calculated). Accordingly, the timing information from the portable electronic device can be provided to the mobile device.

To address this potential issue, the mobile device can identify a range of time values around the timing information (e.g., if the timing information identifies 2:30 pm, the range could include a time range of values spaced at five-minute intervals from 1:30 pm to 3:30 pm). One or more values in the range of time values can be used to retrieve, or calculate, a set of derived hardware addresses, and these addresses can be compared to a derived hardware address, that was received from the portable electronic device, to determine if the mobile device and portable electronic device are paired.

The mobile device can use proximity message payloads to determine whether the transmitting portable electronic device is in a near state or a far state. The hardware addresses from the payloads of multiple proximity messages, received at a mobile device, can be compared to determine if the hardware address changes over a short-term period (e.g., every 30 minutes) or if the address changes over a long-term period (e.g., every 24 hours). Short-term changes can indicate that the portable electronic device is near a paired mobile device and long-term changes can indicate that the portable electronic device is in a far state.

Once a portable electronic device is found to be in a far state, proximity messages from the device can be monitored to determine if the portable electronic device's behavior is consistent with unwanted tracking. A mobile device may flag a near state portable electronic as performing unwanted tracking if the mobile device receives messages from the near state device for a sufficiently long time period (e.g., 5 minutes (min), 10 min, 15 min, 20 min, 30 min, 45 min, 1 hour, 1.5 hours, 2 hours, 3 hours, 4 hours, or 6 hours). A near state device may be flagged as an unwanted tracking device if a mobile device receives a threshold number of proximity messages, with a near state payload, from the near state device (e.g., 2 messages, 3 messages, 4 messages, 5 messages, 10 messages, 20 messages, 30 messages, 40 messages, 50 messages, or 100 messages).

The mobile device may record the location where proximity messages are received, and the device can use this location data to flag unwanted tracking devices. For instance, a near state electronic device may be flagged, by a mobile device, as an unwanted tracking device if proximity messages, with the same derived hardware address, are received at a threshold number of different locations (e.g., 2 locations, 3 locations, 4 locations, 5 locations, or 10 locations). A mobile device may flag a portable electronic device as a near state device if proximity messages are received at two or more locations over a sufficiently long time period (e.g., proximity messages are received over a 30-minute time period at each location). The time period at each location can be 5 min, 10 min, 15 min, 20 min, 30 min, 45 min, 1 hour, 1.5 hours, 2 hours, 3 hours, 4 hours, or 6 hours. The mobile device can determine that the device has moved between two locations if the mobile device's movement exceeds a threshold.

The mobile device can consider movement data from the mobile device's sensors to determine if unwanted tracking is occurring. For instance, a mobile device may notify the user of unwanted tracking if, while the mobile device detects that the device is driving in a car, proximity messages are received from a near state device. Similarly, the mobile device can flag a near state device as performing unwanted tracking if proximity messages with a near state payload are received while the phone detects that the user is on a run, a walk, or an airplane. The mobile device may flag the near state device as an unwanted tracking device if the proximity messages with a near state payload are received over a threshold period of time at each location or if a threshold number of messages are received at each location. The type of location where a mobile device receives a near state proximity message can be used to identify unwanted tracking. For instance, a near state electronic device may be identified by the mobile device as an unwanted tracking device if proximity messages are received at a first location and at a second personal location (e.g., home, office, etc.).

1. System Architecture

A mobile device can detect unwanted tracking by monitoring for proximity messages received from a portable electronic device. The mobile device can process the proximity messages' payload to determine if the portable electronic device is in a near state or a far state. By monitoring the proximity messages, and the device state, the mobile device can determine if the portable electronic device is an unwanted tracking device.

Figure 3:
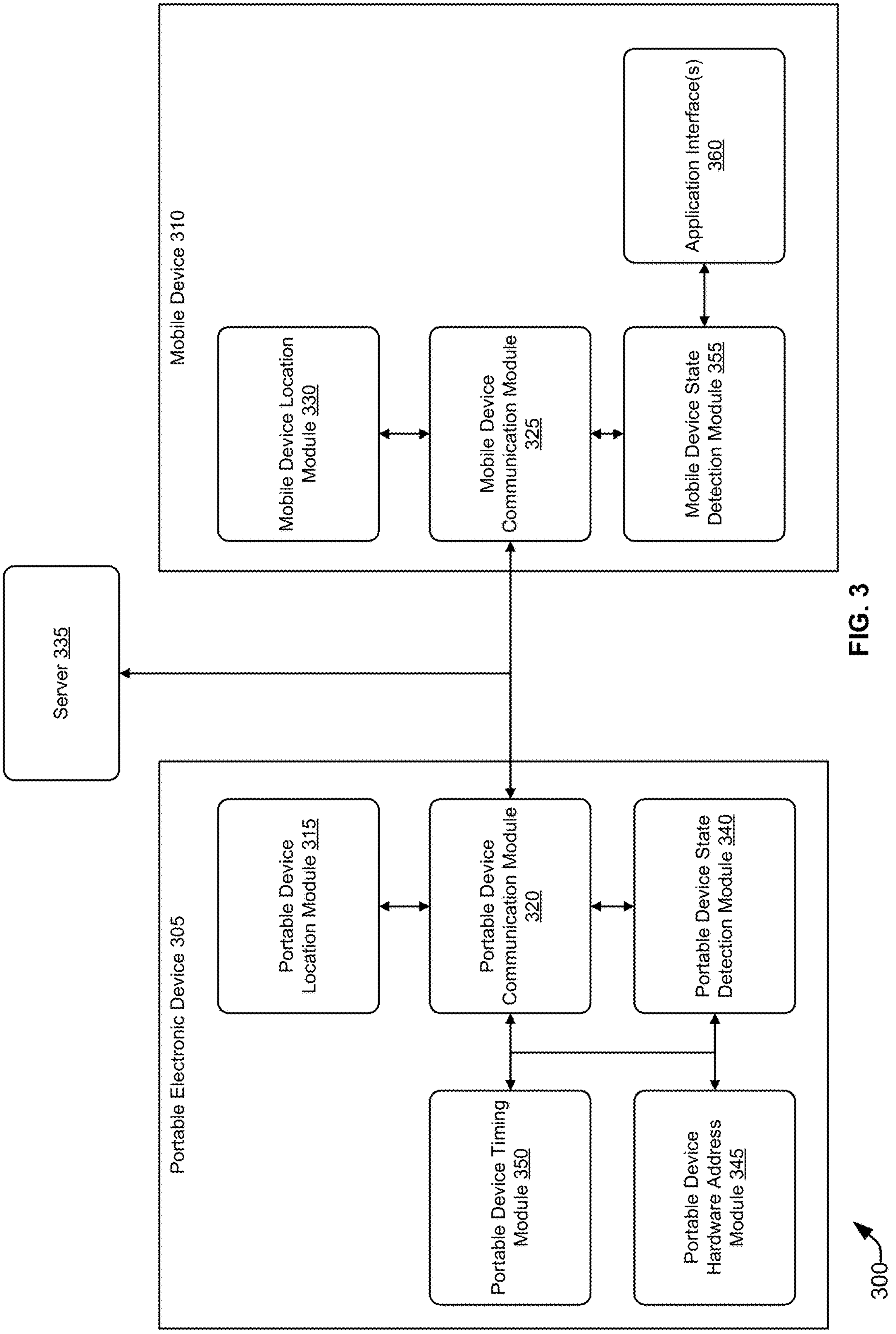
FIG. 3 is a system architecture for detecting unwanted tracking according to embodiments of the present disclosure.

FIG. 3 is a system architecture 300 for detecting unwanted tracking according to embodiments of the present disclosure. Portable electronic device 305 can be any electronic device that is capable of wireless communication to a mobile device 310. The portable electronic device 305 can be used to provide location information to a mobile device that is paired with the portable electronic device 305. In some embodiments, portable electronic device 305 may have a location module 315 that can determine the device's location (e.g., via GPS). The location module 315 can provide this information to mobile device 310 in the payload of a proximity message that is sent via a portable device communication module 320.

Mobile device 310 can receive the proximity message, with the portable electronic device's location, at a mobile device communication module 325. The location of portable electronic device 305 can be extracted from the proximity message payload by mobile device communication module 325, and the communication module can forward the location, via a network connection, to a server 335 storing location information corresponding to portable electronic device 305.

The proximity message received at mobile device communications module 325 may not include location information, and mobile device 310 can retrieve location information from mobile device location module 330. This retrieved location information can be forwarded by mobile device communication module 325 to server 335. The message to server 335 may include an anonymized identifier, such as a derived hardware identifier, so that a mobile device paired with portable electronic device 305 can retrieve the location information without mobile device 310 knowing the paired device's location.

The location information for a message received from portable electronic device 305 may be forwarded by mobile device 310 if the message is a far state message. A proximity message with a far state payload (e.g., a far state message) can be reported to server 335, however, a message with a near state payload (e.g., a near state payload) may not be reported to the server. A near state proximity message indicates that portable electronic device 305 has determined that the device is near a paired device, and, in such circumstances, the location information may be reported from the portable electronic device 305 to the paired electronic device in a proximity message payload.

Portable device communication module 320 can transmit proximity messages with different payloads depending on whether the portable electronic device 305 is in a near state or a far state. A recipient of these proximity messages, such as mobile device 310, can use the state of portable electronic device 305 to determine whether the device is performing unwanted tracking. A portable device state detection module 340 can determine the portable device's state based on reply messages received at portable device communication module 320 (e.g., whether a reply message received or not and whether it is from a paired mobile device). In some implementations, a mobile device only sends a reply message when it is paired to the portable device. In other implementations, the portable device can determine whether a reply message is from a paired mobile device.

Reply messages received at the portable device communication module 320 forwarded to the portable device state detection module 340. The reply message can be used by the portable device state detection module 340 to determine if the portable electronic device 305 is in a near state or a far state. For instance, a portable electronic device may be in a near state for the duration of a time period that begins after a threshold number of reply messages are received from a paired mobile device. This time period can restart at each subsequent reply message above the threshold that is received during the time period (e.g., a 30:00-minute time period restarts as long as a reply message is received between 00:00 minutes and 29:59 minutes). The threshold can be 0 reply messages, 1 reply message, 2 replay messages, 3 reply messages, 4 reply messages, 5 reply messages, 10 reply messages, 20 reply messages, 30 reply messages, 40 reply messages, 50 reply messages, or 100 reply messages. In addition, or alternatively, a portable electronic device may be in a far state if the device has not received a reply message by the conclusion of a time period that begins when the device transmits a threshold number of proximity message. The threshold can be 0 proximity messages, 1 proximity message, 2 replay messages, 3 proximity messages, 4 proximity messages, 5 proximity messages, 10 proximity messages, 20 proximity messages, 30 proximity messages, 40 proximity messages, 50 proximity messages, or 100 proximity messages.

The portable device communication module 320 can collect information from one or more modules to prepare a proximity message payload. The key derivation function used by portable device hardware address module 345 can be associated with a protocol identifier, and the derived hardware address, with the protocol identifier, can be provided to the portable device communication module 320 by the portable device hardware address module 345. The derived hardware address may be provided in response to a request from the portable device communication module 320. The request may be triggered by a determination that portable electronic device 305 is in a near state, and the portable device communication module 320 may reuse a derived hardware address from a previous proximity message when the portable electronic device is in a far state. The portable device timing module 350 can provide timing information to the portable device communication module 320, and the current state for portable electronic device 305 can be provided from portable device state detection module 340 to portable device communication module 320.

The portable device communication module 320 can prepare and transmit a proximity message to the mobile device communication module 325. The proximity message payload can depend on the information indicating the device state received from portable device state detection module 340. For instance, the proximity message payload may include a state flag indicating whether the proximity message is in a near state or a far state. The proximity message may include a derived hardware address that the portable device communication module 320 requests from portable device hardware address module 345. The derived hardware address can be requested after each near state proximity message, after a first threshold number of proximity messages have been transmitted, or after a first time period. The derived hardware address for far state proximity messages may not change and the portable device communication module may request a new derived hardware address after a second threshold number of proximity messages or after a second time period. The derived hardware address can change at a relatively rapid rate when the portable electronic device 305 is in a near state, and the derived hardware address may rotate at a relatively slow rate for a far state portable electronic device. Accordingly, the first time period can be shorter than the second time period and the first threshold can be smaller than the second threshold.

Mobile device 310 can use proximity messages received from portable electronic device 305 to determine the portable device's state. Portable electronic device 305 can be in a near state, when the device is in communication with (e.g., receiving reply messages from) a paired mobile device, or the device can be in a far state when the device is not in communication with (e.g., not receiving reply messages from) a paired mobile device. In some embodiments, the portable electronic device 305 can determine whether the device is in a near state or a far state using information from the portable device without considering whether the device is receiving reply messages. The proximity message can be received at mobile device communication module 325 and the module can provide the hardware address, timing information, and protocol identifier, from the proximity message to mobile device state detection module 355.

The mobile device 310 can use the payload from reply messages to determine if the mobile device is paired with portable electronic device 305 and whether the portable device is an unwanted tracking device. The mobile device state detection module 355 can use the protocol identifier to retrieve one or more derived hardware addresses from application interface(s) 360 corresponding to one or more applications that are installed to manage the portable devices. Mobile device state detection module can compare the derived hardware address received from portable electronic device 305 to the retrieved one or more derived hardware addresses to determine if any derived hardware addresses match. If the derived hardware address received from portable electronic device 305 matches any of the one or more retrieved hardware addresses, then portable electronic device 305 and mobile device 310 are paired devices. If the devices are not paired, it is possible that portable electronic device 305 is performing unwanted tracking.

Mobile device 310 can retrieve the hardware addresses from all or some of the applications, e.g., as identified by the protocol identifier. Retrieving the hardware addresses can mean retrieving one or more precalculated hardware addresses or retrieving a key derivation function that the mobile device 310 can use to generate one or more hardware addresses. In some embodiments, applications running on mobile device 310 may have limited runtime access and this limited access can mean that such applications cannot regularly process proximity message workloads. Application interface(s) 360 can access small programs with higher priority runtime access than applications, and such interfaces can be used by the mobile device state detection module 355 to request one or more derived hardware addresses from the applications. A request for derived hardware addresses that is sent via application interface(s) 360 can include timing information and possibly a protocol identifier from a proximity message sent by the portable electronic device 305. In some embodiments, mobile device 310 may retrieve one or more hardware addresses from all of the application interfaces installed on the mobile device (e.g., each of application interface(s) 360).

Mobile device 310 may generate the derived hardware addresses used to determine if the mobile device is paired to portable electronic device 305. In some implementations, the mobile device state detection module 355 or a function within one of the applications can use the protocol identifier to retrieve a key derivation function from the application interface(s) 360. The key derivation function can be used to generate derived hardware addresses from a hardware address that the portable electronic device 305 provided to paired mobile devices during paring. The hardware address and timing information can be used as input to a key derivation function associated with the protocol identifier, and the key derivation function can output a derived hardware address. The output derived hardware addresses can be compared to hardware addresses received from the portable electronic device 305 to determine if the portable electronic device 305 and mobile device 310 are or have previously been paired. If the devices are not paired it is possible that portable electronic device 305 is performing unwanted tracking.

It is possible that there is a desynchronization between the clock in portable device timing module 350 and the clock in mobile device communication module 325. Desynchronized clocks can mean that the key derivation function has incorrect timing inputs, and that the function outputs an incorrect derived hardware address that does not match the received hardware address. To mitigate the possibility that a desynchronization causes mobile device 310 to incorrectly determine that the mobile device is not paired with portable electronic device 305, mobile device communication module 325 can use a range of timing information around the timing information received from portable device communication module 320. This range of timing information can be used to generate a range of derived hardware addresses that can be compared to the derived hardware address received from portable device communication module 320.

2. Flowchart

Figure 4:
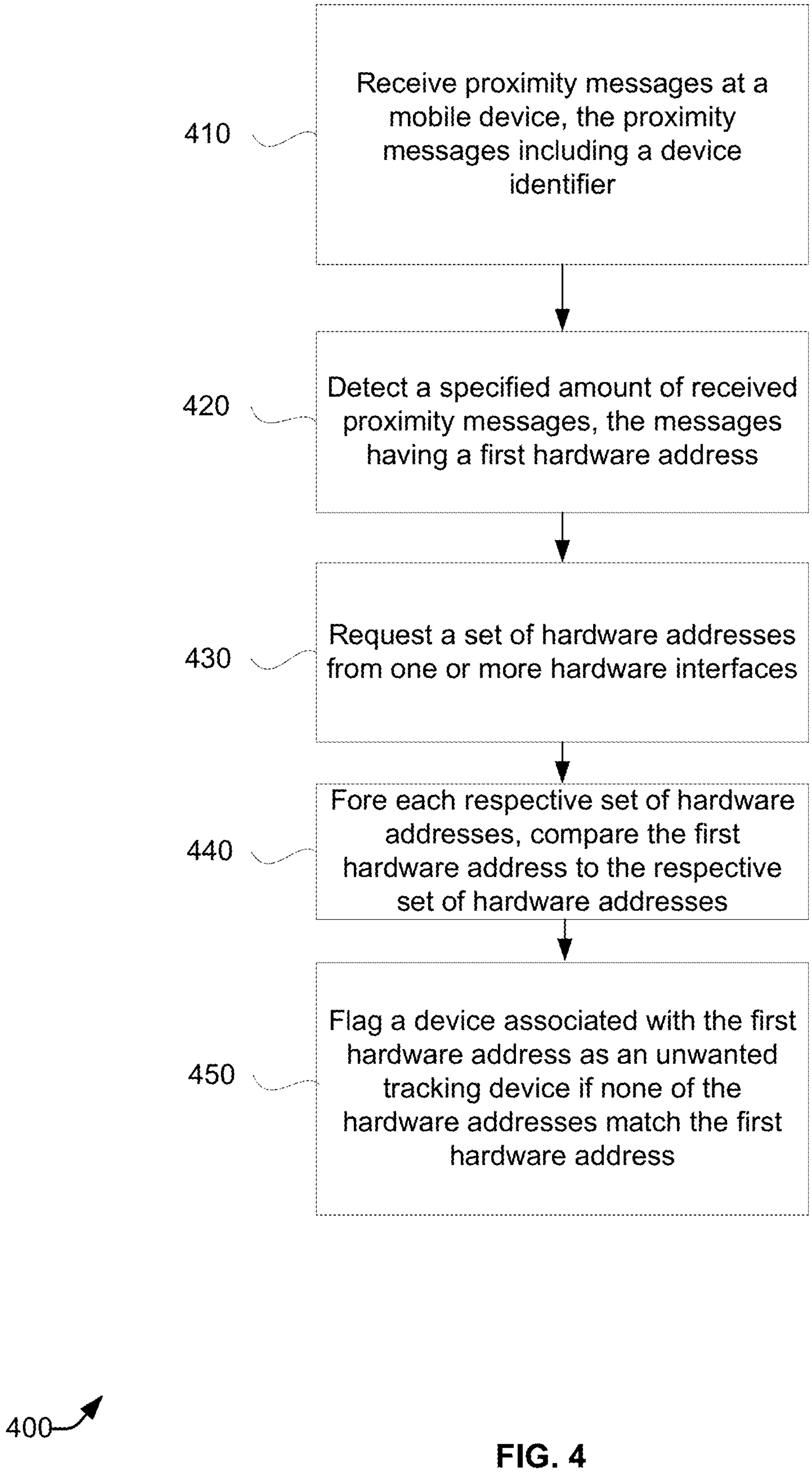
FIG. 4 is a flow chart of process for detecting unwanted tracking by a portable electronic device according to embodiments of the present disclosure.

FIG. 4 is a flow chart of process 400 for detecting unwanted tracking by a mobile device according to embodiments of the present disclosure. In some implementations, one or more process blocks of FIG. 4 can be performed by a mobile device. In some implementations, one or more process blocks of FIG. 4 can be performed by another device or a group of devices separate from or including the mobile device.

At block 410, proximity messages can be received at the mobile device. Each proximity message includes a hardware address. The hardware address can be a derived hardware address that is included in the payload of a proximity message. The hardware address can be a hardware address corresponding to the to a portable electronic device that sent the proximity message. The hardware address can be generated by one or more applications where each application is associated with an application interface.

At block 420, a specified amount of received proximity messages with a first hardware address can be detected. The first hardware address can be a derived hardware address generated using a key derivation function. The first hardware address can be a media access control (MAC) address. A device associated with the first hardware address can transmit the first hardware address in proximity messages for at least a specified amount of time when the mobile devices is separated from a paired mobile device At block 430, a set of hardware addresses can be requested from one or more application interfaces. Each of the one or more application interfaces can be associated with a respective protocol for providing a respective set of hardware addresses, and the protocol can be associated with a key derivation function. The application interface may be a widget in various embodiments, and the widget can facilitate communication with an application on the mobile device. In some embodiments, requesting the set of hardware addresses can comprise requesting a protocol (e.g., key derivation function) from the one or more application interfaces, and this protocol can be used by the mobile device to generate the set of hardware addresses. Each application interface can correspond to an application that is associated with a portable device that is paired to the mobile device. A portable electronic device can provide a corresponding hardware address during a pairing procedure and this corresponding hardware address can be provided as input to the key derivation function in order to generate the derived hardware address. The corresponding hardware address may be requested from a server by the mobile device and the mobile device can provide this hardware address to the portable device during a paring procedure.

At block 440, for each respective set of hardware address, the respective set of hardware addresses can be compared to the first hardware address from 420. If a hardware address in the set of hardware addresses matches the first hardware address, then the mobile device and the portable device that transmitted the hardware address (e.g., a device associated with the first hardware address) may be paired devices.

At block 450, a device associated with the first hardware address is flagged as an unwanted tracking device if none of the hardware addresses from 430 match the first hardware address from 420. The device associated with the first hardware address may be flagged as an unwanted tracking device if a threshold number of proximity messages with the first hardware address are received at the mobile device during a time period. The threshold number of proximity messages may be 0 messages, 1 message, 2 messages, 3 messages, 4 messages, 5 messages, 10 messages, 20 messages, 30 messages, 40 message, 50 messages, or 100 messages. The time period can be 1 second, 2 seconds, 3 seconds, 4 seconds, 5 seconds, 10 seconds, 30 seconds, 1 minute, 5 minutes, 10 minutes, 15 minutes, 30 minutes, 1 hour, 2 hours, or 6 hours.

A user notification can be provided in response to flagging the device associated with the first hardware address as an unwanted tracking device. Providing the user notification can mean displaying a visual notification on a graphical user interface of the mobile device, causing the mobile device to emit a sound, causing lights to blink on the mobile device, or causing the mobile device to vibrate. Disablement instructions may be requested in response to the flagging and these instructions can be presented with the user notification.

Although FIG. 4 shows example steps of process 400, in some implementations, process 400 can include additional steps, fewer steps, different steps, or differently arranged steps than those depicted in FIG. 4. Additionally, or alternatively, two or more of the steps of process 400 can be performed in parallel.

III. Serial Number Lookup

Determining the owner of a portable electronic device can discourage unwanted tracking. The knowledge that a tracked individual can discover the owner of an unwanted tracking device allows for accountability because the device can be linked to the owner who may face consequences for the tracking. In addition, there are practical benefits to determining a portable device owner. For example, roommates may use portable electronic devices to locate their respective keys. A guest visiting the roommates may be asked to move a first roommate's car, and the guest can use the tags' ownership information to determine which of the keys on a coffee table belong to the first roommate.

While providing ownership information can promote accountability, this accountability should be balanced against the owner's interest in privacy. Continuing the example from above, a valet could use the ownership information to track the first roommate if the ownership information is fully discoverable by someone in possession of the portable electronic device. To balance privacy and accountability, an obfuscated, or partial, identifier can be used to provide ownership information that is sufficient for someone who is familiar with the owner to determine the owner's identity without revealing the owner's identity to a stranger.

A. System Diagram

Figure 5:
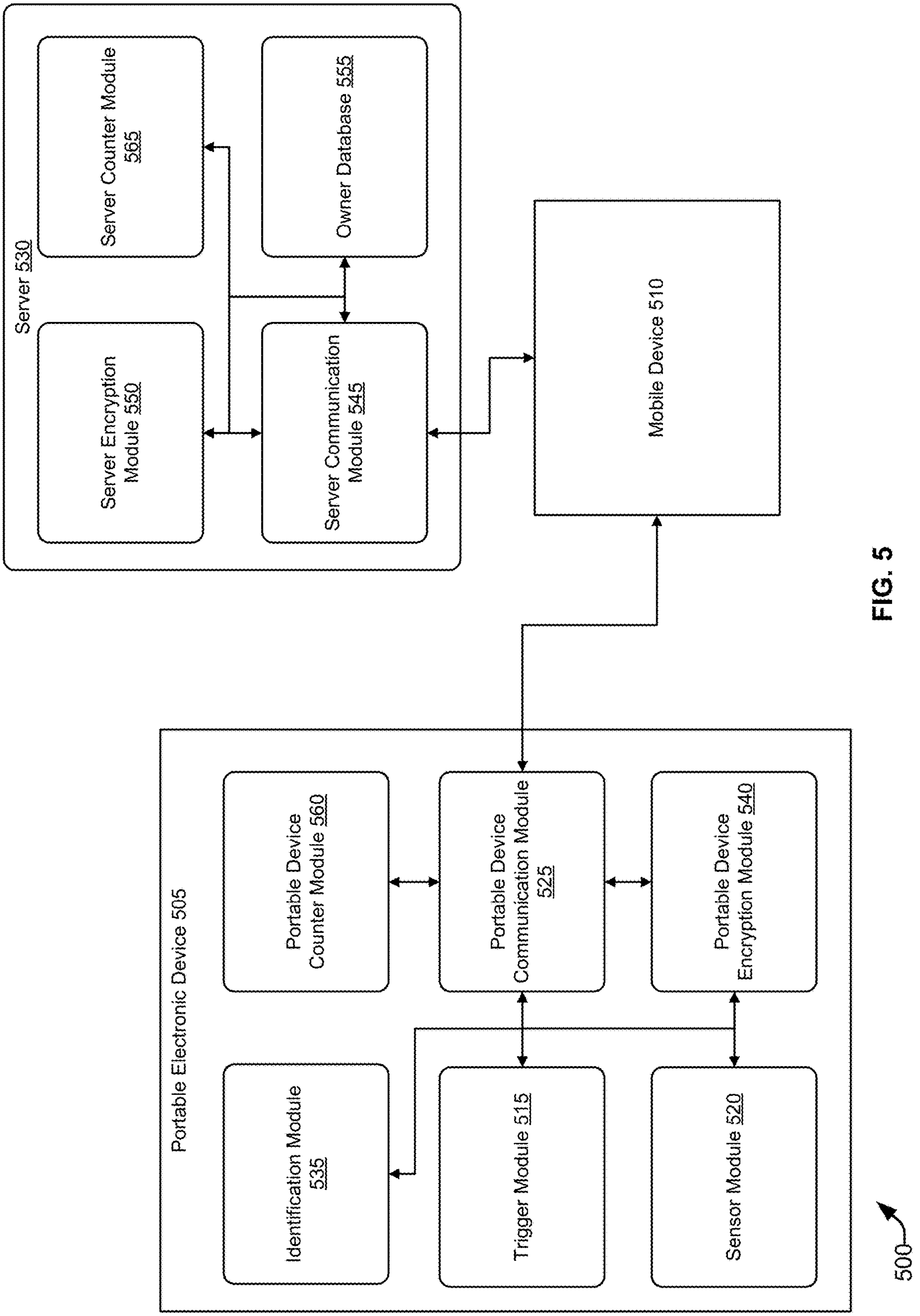
FIG. 5 shows a system architecture for providing a partial identifier to a mobile device according to various embodiments.

FIG. 5 shows a system architecture 500 for providing a partial identifier to a mobile device according to various embodiments. A portable electronic device 505 can provide a partial identifier in response to a trigger event. A trigger event can be caused by interacting with the portable device such as pressing a push button on the portable electronic device, performing gestures with the portable electronic device 505 that are detected by an accelerometer, providing input to a touch panel (e.g., a resistive touch panel or a capacitive touch panel) or a near-field communication signal received from mobile device 510.

A trigger module 515 can determine if a trigger event has occurred. Input to the portable electronic device's sensors can be detected by the portable device sensor module 520 and this input can be provided to the trigger module 515. A near-field communication signal can be received at the portable device communication module 525 from mobile device 510. This signal can be provided to the trigger module 515 to determine if the near-field communication signal is a trigger signal.

1. Encrypted Payload

In response to detecting a trigger signal, trigger module 515 can instruct the portable device communication module 525 to prepare an encrypted payload. The encrypted payload can be used by mobile device 510 to retrieve a partial identifier from server 530 without exposing personal identifiable information to mobile device 510. The portable device communication module 525 can retrieve a product identifier (e.g., serial number) corresponding to portable electronic device 505 from an identification module 535. The portable device communication module 525 can provide the serial number to a portable device encryption module 540, or the identification module @535 can provide the serial number to the portable device encryption module 540.

The portable device encryption module 540 can encrypt the serial number using a public key of server 530 to generate an encrypted payload that includes the encrypted serial number. The public key of server 530 can be provided to portable electronic device 505 by a paired mobile device during device manufacture or the key can be provided when the two devices are first paired for registering with server 530. The public key can be a unique public key that corresponds to the portable electronic device, and the public key can reduce the possibility that a bad actor fakes a request for a partial identifier.

The encrypted payload can be transmitted from the portable electronic device 505 to mobile device 510 in a manner detectable by the mobile device. The manner of transmission can be a transmission over a personal area network (e.g., Bluetooth low energy) or the manner of transmission can be a transmission sent using a near-field communication protocol. The mobile device may not have the public key of server 530 unless the portable electronic device 505 and the mobile device 510 are paired. Accordingly, the mobile device 510 may not be able to detect the portable electronic device's identity unless the devices are paired. After encryption, the mobile device 510 can forward the encrypted payload to the server 530 over a network such as the Internet.

Server 530 can receive the encrypted payload from mobile device 510 at a server communication module 545. The server communication module 545 can use a private key of server 530 to decrypt the encrypted payload to extract the serial number corresponding to portable electronic device 505. The serial number can be provided directly to an owner database 555 or the serial number can be sent from server encryption module 550 to owner database 555 via server communication module 545. The serial number can be sent to owner database 555 with a request to locate any entries corresponding the serial number. The entries, comprising at least a partial identifier, can be returned to server communication module 545. In some embodiments, the owner database can return an identifier to server communication module 545, and the module can generate a partial identifier. This partial identifier can be provided to the mobile device 510.

A partial identifier can be an identifier that has been partially redacted so that the identifier is not fully exposed to mobile device 510. For example, the partial identifier can be a phone number, an email address, a user identifier, an account name, or any combination of thereof. The partial identifier can be generated by partially replacing characters in the identifier so that the full identifier is difficult to reconstruct from the partial identifier, but an owner of the portable electronic device 505, or someone familiar with the owner, may be able to determine the owner's identity. For example, an identifier can be: my.email@provider.com and the partial identifier could be m***ai*1**vid*r.com.

2. Use of Counter

The partial identifier is generated randomly, or semi-randomly, with the hidden characters changing between requests. The partial identifier is randomized in part so that the partial identifier does not become a proxy for the device identifier because the same partial identifier would always correspond to the same device. A potential concern is that a bad actor could sent repeated requests for partial identifiers to server 530 and reconstruct the identifier from a plurality of partial identifiers. To address this concern, a counter can be added to the encrypted payload and the counter in the payload can be compared to a counter on the server. If the counters do not match, or if the counter in the payload is smaller than the counter on the server, the encrypted payload can be ignored, and no response is sent from server 530 to mobile device 510.

Portable electronic device 505 can add a portable device counter to the encrypted payload. The portable device counter can be a numeric value that is provided to portable device encryption module 540 by portable device counter module 560. The portable device counter can be provided directly from, portable device counter module 560 or via portable device communication module 525. The portable deice counter can be added to the encrypted payload along with a product identifier such as a serial number and the portable device encryption module 540 can sign the counter with the public key of server 530. This digital signature can be used by the server to verify that the portable device generated the encrypted payload. For instance, the server can decrypt the encrypted payload with a public key of the server.

The encrypted payload can be sent from the portable device encryption module 540 to the server 530. The encrypted payload can be sent via portable device communication module 525 and mobile device 510 before being received at server communication module 545. The encrypted payload can be sent to server encryption module 550 for decryption and the portable device counter can be sent to server counter module 565 either directly or via sever communication module 545. Server counter module 565 can compare the portable device counter to a server counter in the server counter module 565. If the portable device counter is larger than the server counter, then the server counter module 565 can provide information indicating approval to send a partial identifier in response to the encrypted payload. If the portable device counter is smaller than the server counter, then the server counter module 565 can send information withholding approval to send the partial identifier in response to the encrypted payload.

B. Methods

1. Portable Device

Figure 6:
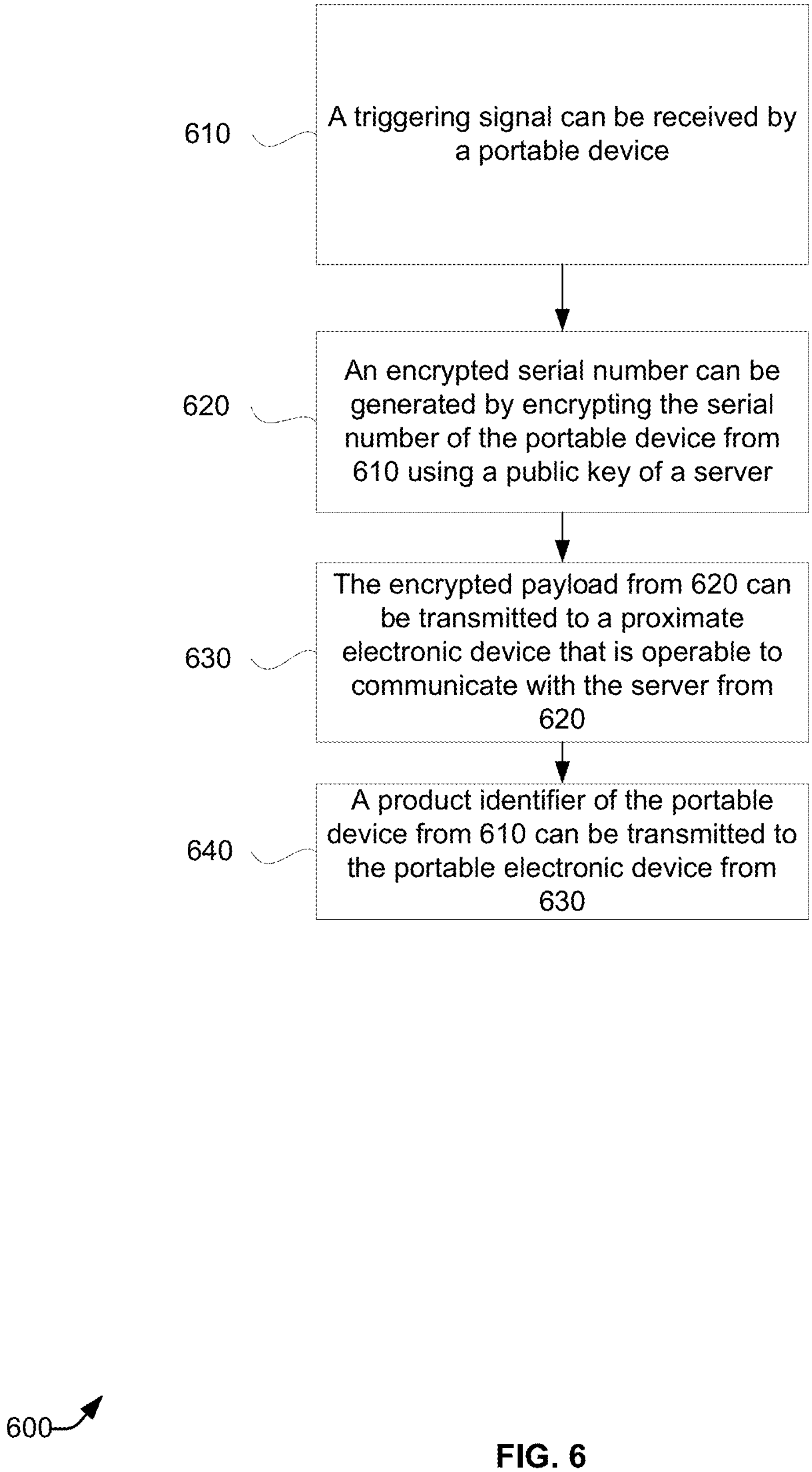
FIG. 6 is a flow chart of a process for providing an identifier for a portable electronic device according to various embodiments.

FIG. 6 is a flow chart of process 600 for techniques for providing an identifier for a portable electronic device according to various embodiments. In some implementations, one or more process blocks of FIG. 6 can be performed by a portable device. In some implementations, one or more process blocks of FIG. 6 can be performed by another device or a group of devices separate from or including the portable device.

At block 610, a triggering signal can be received by a portable device (e.g., portable electronic device). The triggering signal can be received over a short-range wireless communication network (e.g., Bluetooth low energy (BLE) or near-field communication network). The triggering signal can be received at a sensor of the portable device (e.g., an accelerometer, a push button, or a touch panel).

At block 620, an encrypted serial number can be generated by encrypting the serial number of the portable device using a public key of a server to obtain an encrypted payload. The encrypted payload may include a digital signature of a portable device counter. The digital signature can be used by the server to authenticate the encrypted payload. The portable electronic device counter can be compared to a server counter to determine if the encrypted payload has been reused (e.g., if it was previously transmitted). The portable device counter may have been reused if the value of the portable device counter is less than or equal to the value of the server counter.

At block 630, the encrypted payload from 620 can be transmitted in a manner detectable by a proximate electronic device that is operable to communicate with the server. The encrypted payload can be transmitted in response to the triggering signal from 610. The proximate electronic device can be a mobile device, and a mobile device can communicate with the server over a network connection (e.g., the internet). The portable device can transmit the encrypted payload via a short-range communication circuit.

At block 640, a product identifier of the portable device can be transmitted to the portable electronic device. The product identifier can indicate an identity of the server to the proximate electronic device. The product identifier can be an internet protocol (IP) address, a uniform resource locator (URL), or a uniform resource indicator (URI). The product identifier can be transmitted in response to the triggering signal from 610.

Although FIG. 6 shows example steps of process 600, in some implementations, process 600 can include additional steps, fewer steps, different steps, or differently arranged steps than those depicted in FIG. 6. Additionally, or alternatively, two or more of the steps of process 600 can be performed in parallel.

2. Server

Figure 7:
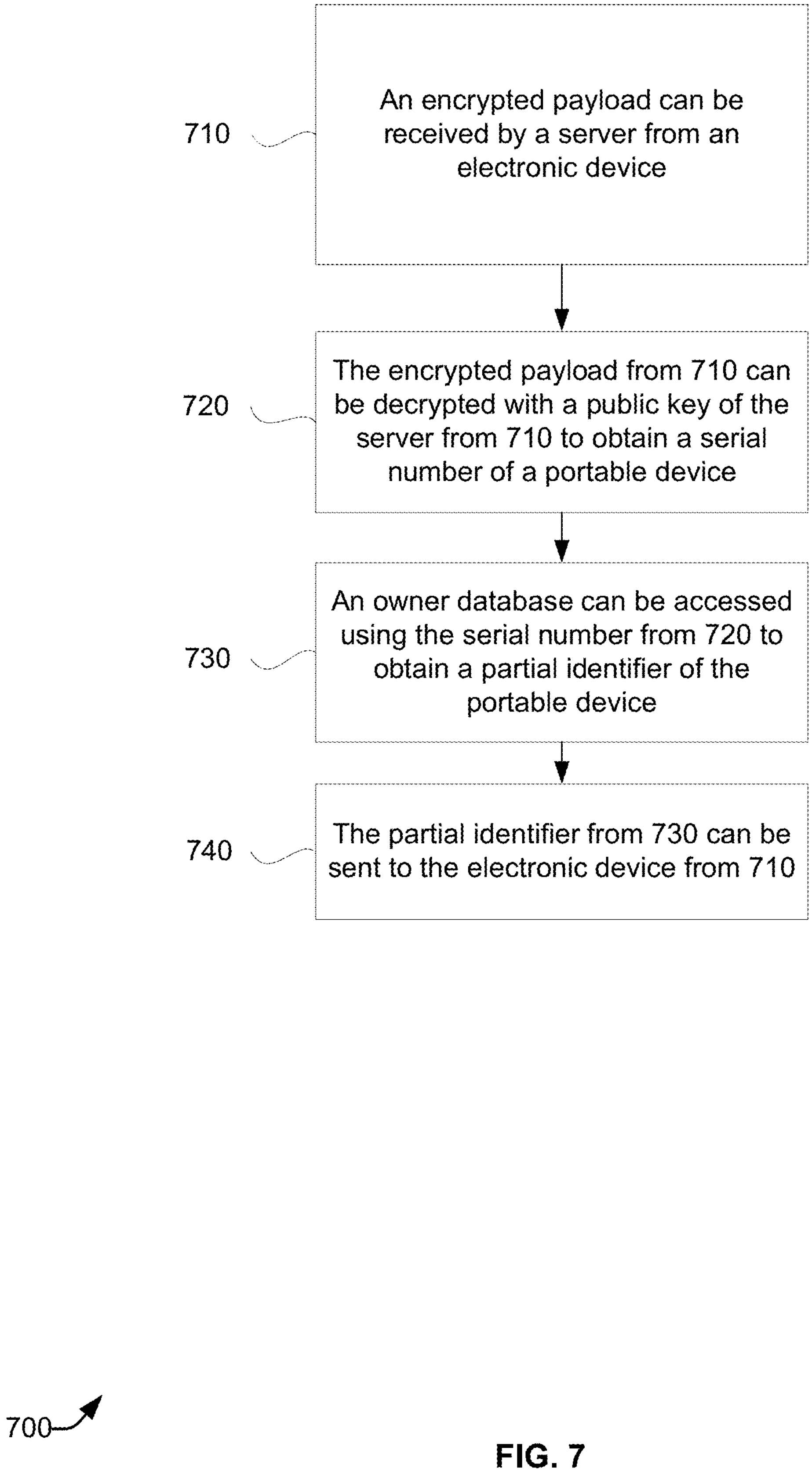
FIG. 7 is a flow chart of a process for providing an obfuscated identifier for a portable electronic device according to various embodiments.

FIG. 7 is a flow chart of process 700 for techniques for providing an obfuscated identifier for a portable electronic device according to various embodiments. In some implementations, one or more process blocks of FIG. 7 can be performed by a server (e.g., mobile device or computer device). In some implementations, one or more process blocks of FIG. 7 can be performed by another device or a group of devices separate from or including the server.

At block 710, an encrypted payload can be received by a server. The encrypted payload can be received from an electronic device (e.g., a mobile device). The payload can include a serial number for a portable device and a digital signature. The payload may be encrypted with a public key that corresponds to the electronic device. The payload can be verified by verifying the digital signature. For example, a first secret value can be identified in the digital signature and this can be compared to a second secret value calculated using a public key corresponding to a private key that was used to generate the digital signature. The payload can be verified if the first secret value and the second secret value match. In some embodiments, the public key can be a private key or a symmetric key.

At block 720, the encrypted payload from 710 can be decrypted to obtain a serial number of a portable device that provided the encrypted payload to the electronic device. The encrypted payload can be decrypted using a private key. The private key can be a private key that corresponds to the electronic device from 710

At block 730, an owner database can be accessed using the serial number from 720 to obtain a partial identifier of the portable device. The partial identifier can be a redacted phone number, a redacted email address, a redacted account number, or a redacted username.

At block 740, the partial identifier from 730 can be sent to the electronic device from 710. The partial identifier can be sent after comparing a portable device counter to server counter associated with the serial number from 710. If the server counter does not match any of the plurality of past counters, the partial identifier can be sent to the electronic device. The portable device counter may not match the server counter if the server counter is a value with a larger magnitude than the portable device counter.

Although FIG. 7 shows example steps of process 700, in some implementations, process 700 can include additional steps, fewer steps, different steps, or differently arranged steps than those depicted in FIG. 7. Additionally, or alternatively, two or more of the steps of process 700 can be performed in parallel.

IV. Disablement

Portable electronic devices can report their location for the duration of their battery life; however, this reporting can be halted through a disablement procedure. This disablement procedure can be made available to a mobile device user who is in possession of a portable electronic device because the portable device can provide information identifying a location where the disablement procedure can be retrieved. For example, the information can be a uniform resource locator (URL) identifying a server storing the disablement procedure. A mobile device receiving this information can display the disablement instructions to the device's user though a user interface.

The disablement procedure can be a physical action that can be performed on the portable electronic device. For example, the disablement procedure can include a button press, a gesture, removal of a battery, or any combination thereof. The disablement procedure can be shown in the user interface with one or more of text instructions or visual depictions (e.g., a diagram of the accessory or images). Upon receiving an unwanted tracking alert at a mobile device, the device can display the instructions on the device's user interface without additional input from the user. Presenting the disablement procedure on the mobile device and providing information from the portable electronic device so that the disablement procedure can be located, is automatic and not optional. In addition, a portable electronic device must be able to support the disablement procedure and a user cannot prevent the device from supporting this functionality.

Figure 8:
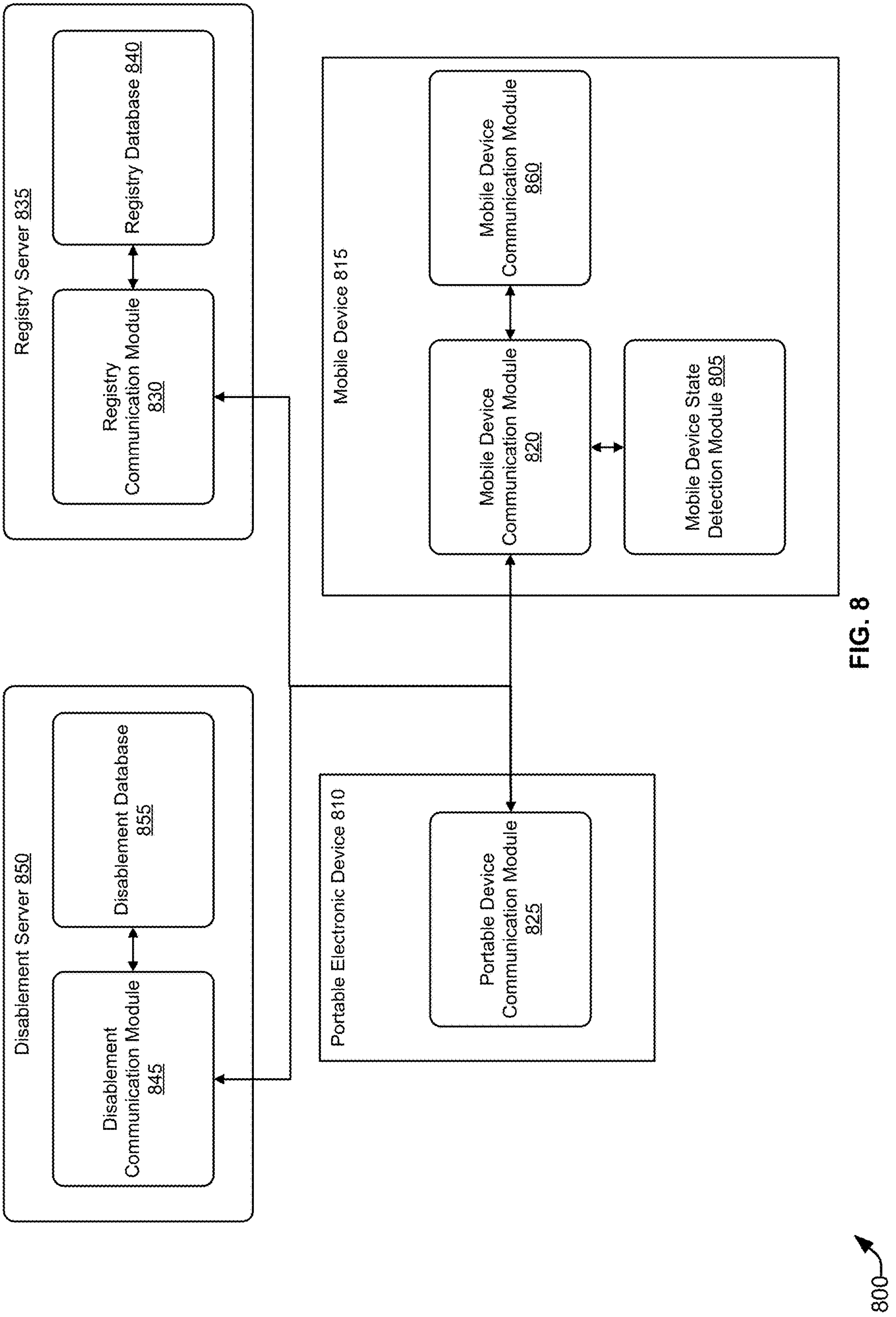
FIG. 8 is a system architecture for providing disablement instructions to a mobile device according to various embodiments.

FIG. 8 is a system architecture 800 for providing disablement instructions to a mobile device according to various embodiments. A mobile device state detection module 805 can determine that a portable electronic device 810 is performing unwanted tracking based on proximity messages exchanged between the portable device and a mobile device 815. In response to this determination, the mobile device communication module 820 can request a product identifier from the portable device communication module 825.

Upon receiving the product identifier, mobile device communication module 820 can send the identifier to a registry communication module 830 on a registry server 835. The registry server 835 can include a registry database with product identifier to address (e.g., uniform resource locator (URL) mappings. The addresses can correspond to websites hosting disablement instructions for the portable electronic device 810. The registry communication module 830 can send a request to the registry database 840 for all addresses corresponding to the product identifier and the database can return any matching address(es).

In response to receiving the matching address(es), the registry communication module 830 can return the address(es) to the mobile device communication module. In some embodiments, the portable electronic device 810 can send the address directly to the mobile device communication module 820 without the need for registry server 835.

In response to receiving the address(es), the mobile device communication module 820 can request disablement instructions from a disablement communication module 845 of a disablement server 850. The disablement communication module can retrieve the disablement instructions from a disablement database 855, and the instructions can be returned to the mobile device communication module 820. Upon receiving the instructions, the mobile device 815 can display the instructions on a user interface controllable by user interface module 860.

V. Example Devices

Figure 9:
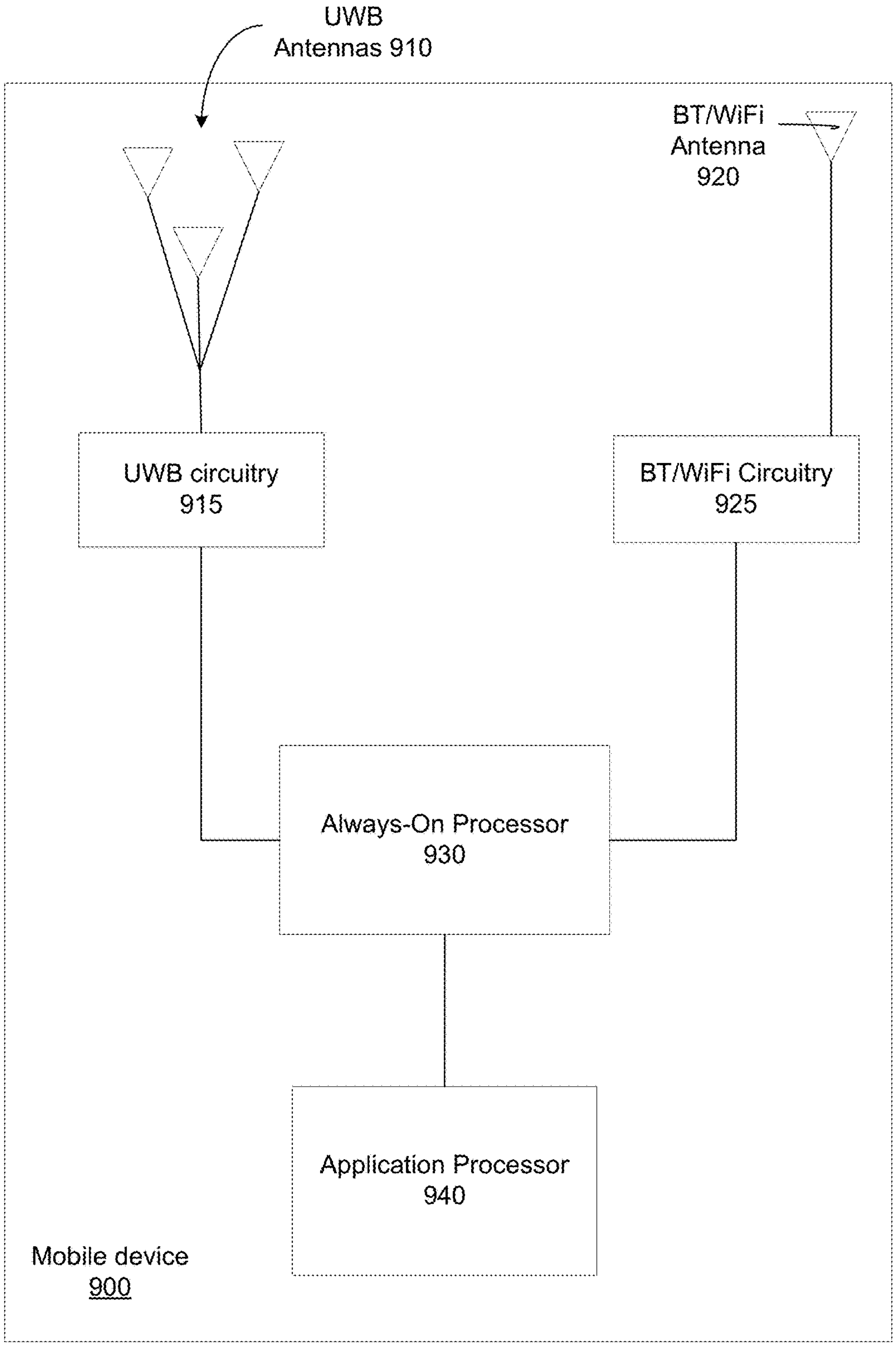
FIG. 9 is a block diagram of components of a mobile device operable to perform ranging according to embodiments of the present disclosure.

FIG. 9 is a block diagram of components of a mobile device 900 operable to perform passive beacon communication techniques according to embodiments of the present disclosure. Mobile device 900 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 900 includes UWB antennas 910 for performing ranging. UWB antennas 910 are connected to UWB circuitry 915 for analyzing detected signals from UWB antennas 910. In some embodiments, mobile device 900 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 10 degrees. Such regulation can allow a determination of which direction a user is pointing a device relative to one or more other nearby devices. The field of view may include any one or more of pitch, yaw, or roll angles.

UWB circuitry 915 can communicate with an always-on processor (AOP) 930, which can perform further processing using information from UWB messages. For example, AOP 930 can perform the ranging calculations using timing data provided by UWB circuitry 915. AOP 930 and other circuits of the device can include dedicated circuitry and/or configurable circuitry, e.g., via firmware or other software.

As shown, mobile device 900 also includes Bluetooth (BT)/Wi-Fi antenna 920 for communicating data with other devices. Bluetooth (BT)/Wi-Fi antenna 920 is connected to BT/Wi-Fi circuitry 925 for analyzing detected signals from BT/Wi-Fi antenna 920. For example, BT/Wi-Fi circuitry 925 can parse messages to obtain data (e.g., an authentication tag), which can be sent on to AOP 930. In some embodiments, AOP 930 can perform authentication using an authentication tag. Thus, AOP 930 can store or retrieve a list of authentication tags for which to compare a received tag against, as part of an authentication process. In some implementations, such functionality could be achieved by BT/Wi-Fi circuitry 925.

In other embodiments, UWB circuitry 915 and BT/Wi-Fi circuitry 925 can alternatively or in addition be connected to application processor 940, which can perform similar functionality as AOP 930. Application processor 940 typically requires more power than AOP 930, and thus power can be saved by AOP 930 handling certain functionality, so that application processor 940 can remain in a sleep state, e.g., an off state. As an example, application processor 940 can be used for communicating audio or video using BT/Wi-Fi, while AOP 930 can coordinate transmission of such content and communication between UWB circuitry 915 and BT/Wi-Fi circuitry 925. For instance, AOP 930 can coordinate timing of UWB messages relative to BT advertisements.

Coordination by AOP 930 can have various benefits. For example, a first user of a sending device may want to share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 930. In addition, it is not desirable to wake up the application processor of every other device in the room, and thus the AOPs of the other devices can perform some processing of the messages and determine that the destination address is for a different device.

To perform ranging, BT/Wi-Fi circuitry 925 can analyze an advertisement signal from another device to determine that the other device wants to perform ranging, e.g., as part of a process for sharing content. BT/Wi-Fi circuitry 925 can communicate this notification to AOP 930, which can schedule UWB circuitry 915 to be ready to detect UWB messages from the other device.

For the device initiating ranging, its AOP can perform the ranging calculations. Further, the AOP can monitor changes in distance between the other devices. For example, AOP 930 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

Figure 10:
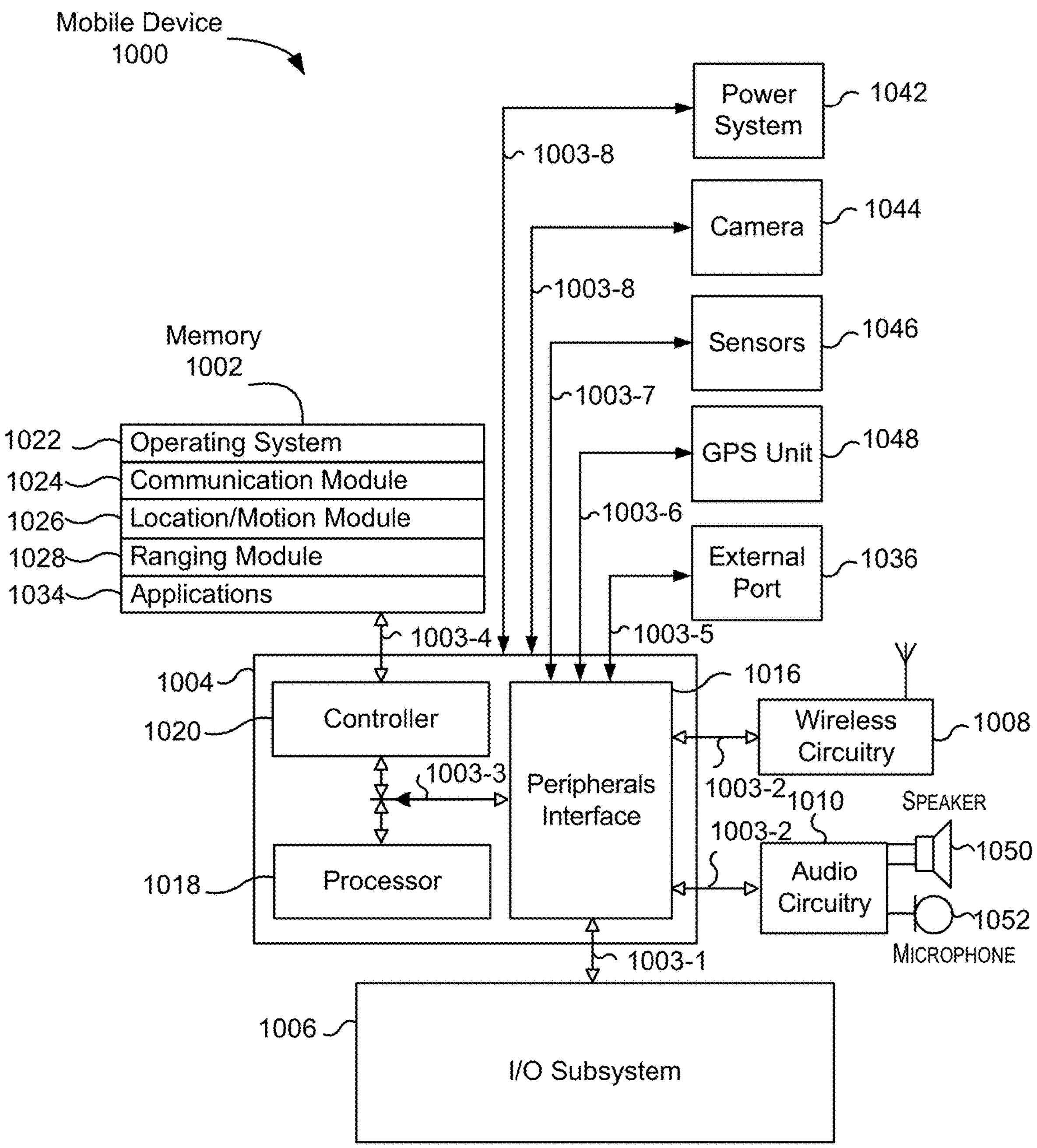
FIG. 10 is a block diagram of an example device according to embodiments of the present disclosure.

FIG. 10 is a block diagram of an example mobile device 1000. The mobile device 1000 can include a smartphone, a wearable device (e.g., a smartwatch, smart glasses), a tablet computer, a laptop computer, or a desktop computer. The mobile device 1000 generally includes computer-readable medium 1002, control circuitry 1004, an Input/Output (I/O) subsystem 1006, wireless circuitry 1008, and audio circuitry 1010 including speaker 1050 and microphone 1052. These components may be coupled by one or more communication buses or signal lines 1003. Mobile device 1000 can be any portable electronic device, including a handheld computer, a tablet computer, a mobile phone, a laptop computer, a tablet device, a media player, a personal digital assistant (PDA), a key fob, a car key, an access card, a multifunction device, a mobile phone, a portable gaming device, a headset, or the like, including a combination of two or more of these items.

It should be apparent that the architecture shown in FIG. 10 is only one example of an architecture for mobile device 1000, and that mobile device 1000 can have more or fewer components than shown, or a different configuration of components. The various components shown in FIG. 10 can be implemented in hardware, software, or a combination of both hardware and software, including one or more signal processing and/or application-specific integrated circuits.

Wireless circuitry 1008 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1008 can use various protocols, e.g., as described herein. In various embodiments, wireless circuitry 1008 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1008 is coupled to control circuitry 1004 via peripherals interface 1016. Peripherals interface 1016 can include conventional components for establishing and maintaining communication between peripherals. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on computer-readable medium 1002.

Peripherals interface 1016 couple the input and output peripherals of mobile device 1000 to the one or more processors 1018 and computer-readable medium 1002. One or more processors 1018 communicate with computer-readable medium 1002 via a controller 1020. Computer-readable medium 1002 can be any device or medium that can store code and/or data for use by one or more processors 1018. Computer-readable medium 1002 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read Only Memory (ROM), FLASH, magnetic and/or optical storage devices, such as disk drives, magnetic tape, CDs (compact disks) and DVDs (digital video discs). In some embodiments, peripherals interface 1016, one or more processors 1018, and controller 1020 can be implemented on a single chip, such as control circuitry 1004. In some other embodiments, they can be implemented on separate chips.

Processors 1018 can include hardware and/or software elements that perform one or more processing functions, such as mathematical operations, logical operations, data manipulation operations, data transfer operations, controlling the reception of user input, controlling output of information to users, or the like. Processors 1018 can be embodied as one or more hardware processors, microprocessors, microcontrollers; field programmable gate arrays (FPGAs), application-specified integrated circuits (ASICs), or the like.

Mobile device 1000 may include storage and processing circuitry such as control circuitry 1004. Control circuitry 1004 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1004 may be used to control the operation of mobile device 1000. This processing circuitry may be based on one or more microprocessors, microcontrollers, digital signal processors, baseband processor integrated circuits, application specific integrated circuits, etc.

Control circuitry 1004 may be used to run software on mobile device 1000, such as internet browsing applications, voice-over-internet-protocol (VOIP) telephone call applications, email applications, media playback applications, operating system functions, etc. To support interactions with external equipment, control circuitry 1004 may be used in implementing communications protocols. Communications protocols that may be implemented using control circuitry 1004 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Mobile device 1000 may include I/O subsystems 1006. I/O subsystems 1006 may include input-output devices. Input-output devices may be used to allow data to be supplied to mobile device 1000 and to allow data to be provided from mobile device 1000 to external devices. Input-output devices may include user interface devices, data port devices, and other input-output components. For example, input-output devices may include one or more displays (e.g., touch screens or displays without touch sensor capabilities), one or more image sensors 1044 (e.g., digital image sensors), motion sensors, and speakers 1050. Input-output devices may also include buttons, joysticks, scrolling wheels, touch pads, key pads, keyboards, microphones 1052, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Mobile device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1000 includes an image sensor 1044 (e.g., a camera). In some embodiments, mobile device 1000 includes sensors 1046. Sensors can include accelerometers, compass, gyrometer, pressure sensors, audio sensors, light sensors, barometers, and the like. Sensors 1046 can be used to sense location aspects, such as auditory or light signatures of a location.

In some embodiments, mobile device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in computer-readable medium 1002 to perform various functions for mobile device 1000. In some embodiments, the software components include an operating system 1022, a communication module 1024 (or set of instructions), a location/motion module 1026 (or set of instructions), a ranging module 1028 that is used as part of ranging operation described herein, and other application programs 1034 (or set of instructions).

Operating system 1022 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. Communication module 1024 can be used to exchange proximity messages with one or more electronic devices. External port 1036 (e.g., universal serial bus (USB), Fire Wire, Lightning connector, 60-pin connector, etc.) is adapted for coupling directly to other devices or indirectly over a network (e.g., the Internet, wireless LAN, etc.).

Location/motion module 1026 can assist in determining the current position (e.g., coordinates or other geographic location identifiers) and motion of mobile device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for mobile device 1000 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data, Ranging module 1028 can send/receive ranging messages to/from an antenna, e.g., connected to wireless circuitry 1008. The messages can be used for various purposes, e.g., to identify a sending antenna of a device, determine timestamps of messages to determine a distance of mobile device 1000 from another device. Ranging module 1028 can exist on various processors of the device, e.g., an always-on processor (AOP), a UWB chip, and/or an application processor. For example, parts of ranging module 1028 can determine a distance on an AOP, and another part of the ranging module can interact with a sharing module, e.g., to display a position of the other device on a screen in order for a user to select the other device to share a data item. Ranging module 1028 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of mobile device 1000 (e.g., portions of the display cover layer, portions of a plastic antenna window in a metal housing sidewall portion of housing, etc.). With one illustrative configuration, some or all of the rear face of mobile device 1000 may be formed from a dielectric. For example, the rear wall of housing may be formed from glass plastic, ceramic, other dielectric. In this type of arrangement, antennas may be mounted within the interior of mobile device 1000 in a location that allows the antennas to transmit and receive antenna signals through the rear wall of mobile device 1000 (and, if desired, through optional dielectric sidewall portions in housing). Antennas may also be formed from metal sidewall structures in housing and may be located in peripheral portions of mobile device 1000.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas are being adversely affected due to the orientation of housing, blockage by a user's hand or other external object, or other environmental factors. Mobile device 1000 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of mobile device 1000 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in mobile device 1000. As an example, antennas may be mounted at one or both ends of mobile device 1000 (e.g., along the upper and lower edges of housing, at the corners of housing, etc.).

Antennas in mobile device 1000 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in mobile device 1000 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1044 may include one or more visible digital image sensors (visible-light cameras) and/or one or more infrared digital image sensors (infrared-light cameras). Image sensors 1044 may, if desired, be used to measure distances. For example, an infrared time-of-flight image sensor may be used to measure the time that it takes for an infrared light pulse to reflect back from objects in the vicinity of mobile device 1000, which may in turn be used to determine the distance to those objects. Visible imaging systems such as a front and/or rear-facing camera in mobile device 1000 may also be used to determine the position of objects in the environment. For example, control circuitry 1004 may use image sensors 1044 to perform simultaneous localization and mapping (SLAM). SLAM refers to the process of using images to determine the position of objects in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1004 may rely entirely upon image sensors 1044 to perform simultaneous localization and mapping, or control circuitry 1004 may synthesize image data with range data from one or more distance sensors (e.g., light-based proximity sensors). If desired, control circuitry 1004 may use a display to display a visual representation of the mapped environment.

Input-output devices may include motion sensor circuitry 1046. Motion sensor circuitry 1046 may include one or more accelerometers (e.g., accelerometers that measure acceleration along one, two, or three axes), gyroscopes, barometers, magnetic sensors (e.g., compasses), image sensors (e.g., image sensor 1044) and other sensor structures. Sensors 1046 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1004 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1004. Movement generation circuitry may include electromechanical actuator circuitry that, when driven, moves mobile device 1000 in one or more directions. For example, movement generation circuitry may laterally move mobile device 1000 and/or may rotate mobile device 1000 around one or more axes of rotation. Movement generation circuitry may, for example, include one or more actuators formed at one or more locations of mobile device 1000. When driven by a motion control signal, actuators may move (e.g., vibrate, pulse, tilt, push, pull, rotate, etc.) to cause mobile device 1000 to move or rotate in one or more directions. The movement may be slight (e.g., not noticeable or barely noticeable to a user of mobile device 1000), or the movement may be substantial. Actuators may be based on one or more vibrators, motors, solenoids, piezoelectric actuators, speaker coils, or any other desired device capable of mechanically (physically) moving mobile device 1000.

Some or all of movement generation circuitry such as actuators may be used to perform operations that are unrelated to rotation of mobile device 1000. For example, actuators may include vibrators that are actuated to issue a haptic alert or notification to a user of mobile device 1000. Such alerts may include, for example, a received text message alert identifying that mobile device 1000 has received a text message, a received telephone call alert, a received email alert, an alarm notification alert, a calendar notification alert, or any other desired notification. By actuating actuator, mobile device 1000 may inform the user of any desired device condition.

Motion sensor circuitry may sense motion of mobile device 1000 that is generated by movement generation circuitry. If desired, motion sensor circuitry may provide feedback signals associated with the sensed motion of mobile device 1000 to movement generation circuitry. Movement generation circuitry may use the feedback signals to control actuation of the movement generation circuitry.

Control circuitry 1004 may use motion sensor circuitry and/or movement generation circuitry to determine the angle of arrival of wireless signals received by mobile device 1000 from another electronic device. For example, control circuitry 1004 may use movement generation circuitry to move mobile device 1000 from one position to another. Motion sensor circuitry may be used to track the movement of mobile device 1000 as it is moved between the different positions. At each position, control circuitry 1004 may receive wireless signals from another electronic device. Control circuitry 1004 may process the received wireless signals together with the motion data from motion sensor circuitry to more accurately determine the position of the other electronic device. The use of motion generation circuitry is merely illustrative, however. If desired, motion sensor circuitry may track movement of mobile device 1000 that is not caused by motion generation circuitry. This may include a user's natural, unprompted movement of mobile device 1000 and/or the user's movement of mobile device 1000 after the user is prompted (by display, audio circuitry 1010, a haptic output device in mobile device 1000, or any other suitable output device) to move mobile device 1000 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 1008 may include radio-frequency transceiver circuitry for handling various radio-frequency communications bands. For example, wireless circuitry 1008 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for a receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of mobile device 1000 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 1034 on mobile device 1000 can include any applications installed on the mobile device 1000, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1006 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode) technology, LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or trackpad. In some embodiments, I/O subsystem 1006 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1006 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, mobile device 1000 can include a touchpad (not shown) for activating or deactivating particular functions. In some embodiments, the touchpad is a touch-sensitive area of the mobile device 1000 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including the location of various electronic devices. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to locate lost personal property and companion animals. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, users may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or," unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method implemented by a portable electronic device having a wireless short-range communication circuit:

transmitting, by the portable electronic device to a mobile device, a first proximity message, wherein the portable electronic device is a portable tracking electronic device, wherein the first proximity message transmitted by the portable electronic device comprises a protocol identifier and a first derived hardware address, the protocol identifier specifying a derivation function used to generate the first derived hardware address, and wherein the first derived hardware address in the first proximity message is generated, by the derivation function, using a private key and first timing information;

receiving a first reply from the mobile device that is paired with the portable electronic device; and transmitting a second proximity message comprising the protocol identifier and a second derived hardware address, wherein the second derived hardware address is generated, by the derivation function, using the private key and second timing information.

2. The method of claim 1, wherein the transmitting further comprises:

providing the protocol identifier and the private key as input to the derivation function; and receiving the first derived hardware address as an output from the derivation function.

3. The method of claim 1, wherein the first timing information comprise local times on an internal clock of the portable electronic device.

4. The method of claim 1, wherein the protocol identifier is configured for use by the mobile device to generate a matching address using the private key.

5. The method of claim 1, further comprising:

responsive to not receiving a second reply message during a time period after transmitting the second proximity message, changing a state flag from a near state to a far state.

6. The method of claim 5, further comprising:

after changing the state flag, transmitting a third proximity message comprising the state flag, the protocol identifier, and the second derived hardware address.

7. The method of claim 1, further comprising:

responsive to not receiving a second reply message after transmitting a threshold number of third proximity messages, changing a state flag from a near state to a far state.

8. A method implemented by a mobile device having a wireless short-range communication circuit, the method comprising:

receiving, from a portable tracking electronic device, proximity messages at the mobile device, wherein each proximity message of the proximity messages includes a hardware address corresponding to the portable tracking electronic device that sent the proximity message;

detecting a specified amount of received proximity messages with a first hardware address;

requesting a set of hardware addresses from one or more application interfaces, where each of the one or more application interfaces is associated with a respective protocol for providing a respective subset of hardware addresses;

for each respective subset of hardware addresses comparing the respective subset of hardware addresses to the first hardware address; and responsive to determining that none of the set of hardware addresses match the first hardware addresses, flagging a first portable device associated with the first hardware address as an unwanted tracking device.

9. The method of claim 8, wherein the set of hardware addresses are generated by one or more applications, and where each application is associated with an application interface of the one or more application interfaces.

10. The method of claim 8, further comprising:

providing a user notification identifying the first portable device associated with the first hardware address.

11. The method of claim 8, wherein each application interface of the one or more application interfaces is associated with an application, where the application is associated with the first portable device that is paired with the mobile device.

12. The method of claim 8, wherein the first portable device associated with the first hardware address transmits the first hardware address in proximity messages for at least a specified amount of time when the first portable device is separated from a paired mobile device.

13. The method of claim 8, wherein requesting the set of hardware addresses comprises:

requesting one or more key derivation functions from the one or more application interfaces; and for each key derivation function of the one or more key derivation functions, generating the respective subset of hardware addresses using the one or more key derivation functions.

14. The method of claim 13, wherein generating the respective subset of hardware addresses further comprises:

providing a paired hardware addresses as input to a key derivation function of the one or more key derivation functions, where the paired hardware address corresponds to a paired portable device; and receiving the subset of hardware addresses as output from the key derivation function.

15. The method of claim 13, wherein the first hardware address is provided as input to a key derivation function.

16. The method of claim 8, wherein the respective subset of hardware addresses is generated by an application corresponding to an application interface of the one or more application interfaces.

17. The method of claim 8, wherein the hardware address is obtained from the first portable device during a pairing procedure.

18. The method of claim 8, wherein a pairing procedure comprises:

requesting the first hardware address corresponding to the first portable device that sent the proximity message from a server; and providing the first hardware address to the mobile device.

19. The method of claim 8, further comprising:

requesting information identifying a location storing disablement instructions from the first portable device in response to flagging the first portable device associated with the first hardware address as the unwanted tracking device;

receiving a response comprising at least the information identifying the location; and sending a request for disablement instructions to the location.

20. The method of claim 8, further comprising:

requesting a product identifier from the first portable device in response to flagging the first portable device associated with the first hardware address as the unwanted tracking device;

transmitting a request for information identifying a location storing disablement instructions from a registry database, the request comprising the product identifier;

receiving a response comprising at least the information identifying the location; and sending a request for disablement instructions to the location.

* * * * *